US012679120B2

(12) United States Patent
Yasuda et al.

(10) Patent No.: US 12,679,120 B2
(45) Date of Patent: Jul. 14, 2026

(54) SHEET SUPPLY DEVICE AND RECORDING DEVICE

(71) Applicant: CANON KABUSHIKI KAISHA, Tokyo (JP)

(72) Inventors: Kosuke Yasuda, Kanagawa (JP); Takakazu Ohashi, Kanagawa (JP); Tomohiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 18/398,668

(22) Filed: Dec. 28, 2023

(65) Prior Publication Data

US 2024/0227422 A1 Jul. 11, 2024

(30) Foreign Application Priority Data

Jan. 10, 2023 (JP) ................................ 2023-001800
Jan. 10, 2023 (JP) ................................ 2023-001805

(51) Int. Cl.

*B41J 15/04* (2006.01)
*B41J 15/16* (2006.01)
*B65H 16/08* (2006.01)
*B65H 16/10* (2006.01)

(52) U.S. Cl.

CPC ............... *B41J 15/04* (2013.01); *B41J 15/16* (2013.01); *B65H 16/08* (2013.01); *B65H 16/106* (2013.01); *B65H 2404/434* (2013.01); *B65H 2515/31* (2013.01); *B65H 2801/36* (2013.01)

(58) Field of Classification Search

CPC ........... B41J 15/04; B41J 15/16; B65H 16/08; B65H 16/106; B65H 16/103
USPC ......................................................... 347/104
See application file for complete search history.

(56) References Cited

U.S. PATENT DOCUMENTS 5,405,205 A * 4/1995 Venthem .................. B41J 15/16 400/636
2011/0187803 A1* 8/2011 Tajima ................... B41J 11/485 271/226
2016/0136980 A1* 5/2016 Kobayashi ............. B65H 23/16 226/91

FOREIGN PATENT DOCUMENTS

JP 10-258553 A 9/1998
JP 2012-187911 A 10/2012
JP 5798854 B2 * 10/2015
JP 5831933 B2 * 12/2015

(Continued)

OTHER PUBLICATIONS

JP 5798854 B2 machine translation (Year: 2025).*
JP 5831933 B2 machine translation (Year: 2025).*

*Primary Examiner* — Stephen D Meier
*Assistant Examiner* — Thomas Ray Knief
(74) *Attorney, Agent, or Firm* — Venable LLP

(57) ABSTRACT

A sheet supply device includes a support portion that rotatably supports a roll sheet, a drive portion that rotates the roll sheet supported by the support portion in a first direction and a second direction opposite to the fist direction, a first supply path to which a sheet from the roll sheet supported by the support portion is supplied, a second supply path to which a sheet from the roll sheet supported by the support portion is supplied, and a conveyance path that conveys the sheet supplied from the first supply path and the second supply path. The drive portion rotates the roll sheet in the first direction and supplies the sheet from the first supply path and rotates the roll sheet in the second direction and supplies the sheet from the second supply path.

13 Claims, 21 Drawing Sheets

(56) References Cited

FOREIGN PATENT DOCUMENTS

| | | | | |
|---|---|---|---|---|
| JP | 2016-104665 A | 6/2016 | | |
| WO | WO-2020152670 A1 * | 7/2020 | ........... | B65H 18/103 |

* cited by examiner

SHEET SUPPLY DEVICE AND RECORDING DEVICE

BACKGROUND OF THE INVENTION

This application claims the benefit of Japanese Patent Application No. 2023-001800, filed on Jan. 10, 2023, and Japanese Patent Application No. 2023-001805, filed on Jan. 10, 2023, which are hereby incorporated by reference herein in their entirety.

FIELD OF THE INVENTION

The present invention relates to a sheet supply device which pulls out a sheet from a roll sheet, around which the sheet is wound, so as to supply the same and a recording device including the sheet supply device.

DESCRIPTION OF THE RELATED ART

In a recording device which records images or the like on a sheet as a recording material, a sheet supply device which rotatably supports a roll sheet and supplies a sheet is provided. Prior to sheet supply by the sheet supply device, an operator sets the roll sheet on the sheet supply device.

Japanese Patent Application Publication No. 2016-104665 discloses a configuration in which a sheet is pulled out of a roll sheet by a contact body that is in contact with the roll sheet from a lower side in a vertical direction so as to convey the sheet along a guide portion. By providing the guide portion that extends from the contact body on a downstream side in a sheet conveying direction and that is provided below the roll sheet, a leading end of the sheet separated from the roll sheet is supplied to a sheet supply portion along the guide portion.

SUMMARY OF THE INVENTION

On the other hand, the aforementioned configuration is based on the premise that the sheet is supplied from the roll sheet wound such that a recording surface (print surface), on which an image is recorded, faces an outer side (hereinafter, referred to as an outward-wound roll sheet). Therefore, when a sheet is supplied from a roll sheet wound, with the recording surface thereof being on an inner side (hereinafter, referred to as an inward-wound roll sheet), it is difficult to lead the leading end of the sheet to a supply path, hence operability and conveyance performance are poor.

Thus, an object of the present invention is to provide a sheet supply device which can supply a sheet regardless of a winding direction of the sheet of a roll sheet.

In order to achieve the aforementioned object, the sheet supply device of the present invention includes the following:

- a support portion that rotatably supports a roll sheet:
- a drive portion that rotates the roll sheet supported by the support portion in a first direction and a second direction opposite to the first direction:
- a first supply path to which a sheet from the roll sheet supported by the support portion is supplied;
- a second supply path to which a sheet from the roll sheet supported by the support portion is supplied; and
- a conveyance path that conveys the sheet supplied from the first supply path and the second supply path, wherein
- the drive portion rotates the roll sheet in the first direction and supplies the sheet from the first supply path and rotates the roll sheet in the second direction and supplies the sheet from the second supply path.

According to the present invention, a sheet supply device which can supply a sheet, regardless of a winding direction of the sheet of a roll sheet, can be provided.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

First Embodiment

First, a recording device according to the First Embodiment of the present invention will be explained. As the recording device, an inkjet recording device including a sheet supply device for supplying a sheet as a print medium and a print portion (recording portion) which prints an image on the sheet will be explained as an application example. Moreover, in this Description, the "ink" is used as a collective name for a liquid such as a recording liquid.

Print Device 100

Figure 1A:
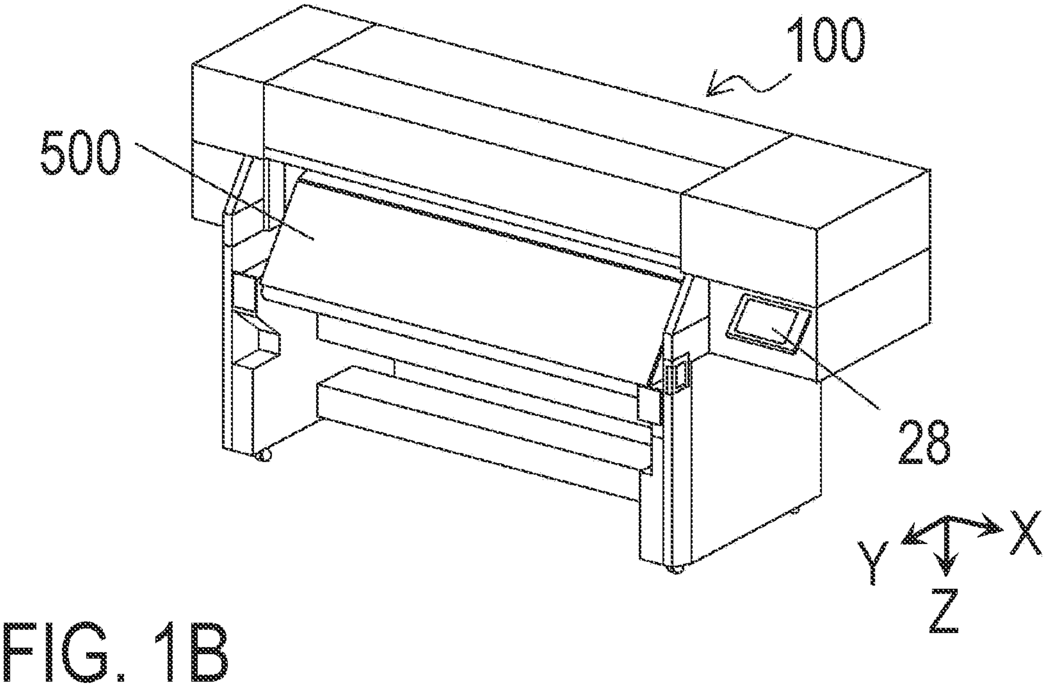
FIGS. 1A and 1B are perspective views of a print device according to a First Embodiment.
Figure 1B:
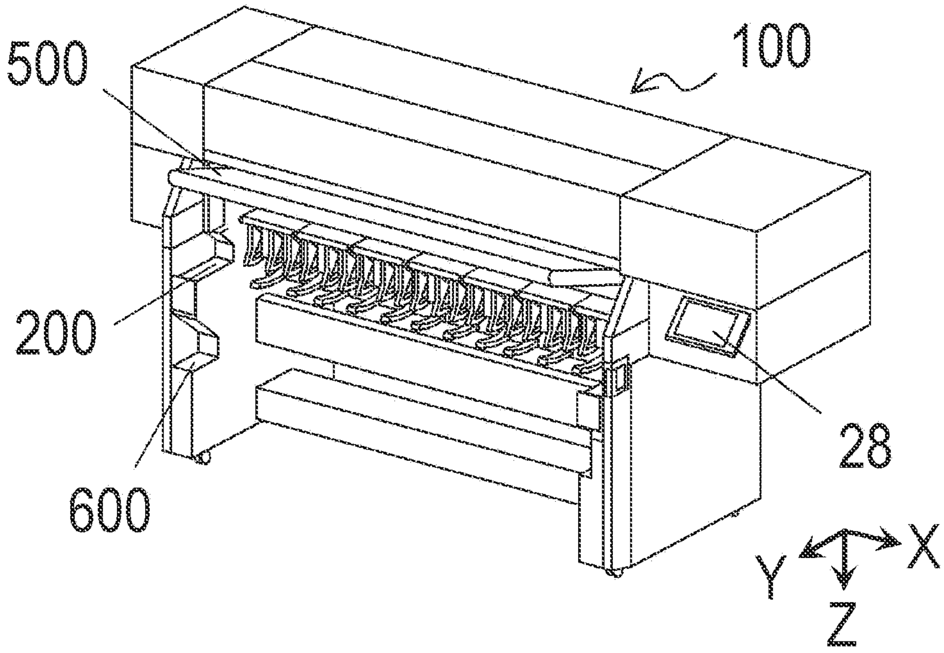

First, a configuration of a print device 100, which is a recording device according to a First Embodiment will be explained. FIGS. 1A and 1B are perspective views of the print device 100 in which a roll sheet R around which a sheet 1 is wound in a roll state can be set. The print device 100 includes a supply device 200 in which a roll sheet R is set and which supplies a sheet 1, a paper-ejection guide portion 500 configured capable of opening/closing on a front side of the print device 100, and a winding device 600 which winds the sheet 1 on which an image is printed.

FIG. 1A is a perspective view of the print device 100 in a state where the paper-ejection guide portion 500 is closed, and a print operation (recording operation) can be performed. FIG. 1B is a perspective view of the print device 100 in which the paper-ejection guide portion 500 is opened, and a user can set the roll sheet R by accessing from a front of the print device 100 to the supply device 200. It is to be noted, that in each of the drawings, a width direction (left-right direction) of the print device 100 is illustrated as an X-axis direction, a front-back direction of the print device 100 as a Y-axis direction, and a gravity direction as a Z-axis direction as appropriate. In this Embodiment, the X-axis direction, the Y-axis direction, and the Z-axis direction are orthogonal to one another. Moreover, the roll sheet R is supported by the print device 100 so that the width direction (axial direction) of the roll sheet R is parallel to a width direction (X-axis direction) of the print device 100.

As shown in FIG. 1B, the supply device 200 and the winding device 600 are both provided on the front side of the print device 100. Moreover, the supply device 200 is located above the winding device 600. In the print device 100, the sheet 1 pulled out of the roll sheet R supported by the supply device 200 provided on the front side is supplied toward a print portion 400 on a rear part (see FIG. 2A and the like). Then, the sheet 1 on which the image was printed in the print portion 400 is wound by the winding device 600 provided on the front side of the print device 100 via the paper-ejection guide portion 500.

In the print device 100, the image is printed on the sheet 1 selectively pulled out of the roll sheet R set in the supply device 200. The user can input various commands to the print device 100 such as size specification of the sheet 1, switching of online/offline and the like by using various switches provided in an operation panel 28 provided on the front side of the print device 100.

The supply device 200 in the First Embodiment includes a support portion capable of setting both the outward-wound roll sheet R1 and the inward-wound roll sheet R2. The supply device 200 is a sheet supply device which can pull out the sheet 1 from the outward-wound roll sheet R1 or the inward-wound roll sheet R2 supported by the support portion and supply them. The outward-wound roll sheet R1 is a roll sheet R wound such that a print surface P is located on the outer side in a radial direction of the roll. The inward-wound roll sheet R2 is a roll sheet R, wound such that the print surface P is located on a center side (inner side) in the radial direction of the roll.

Figure 2A:
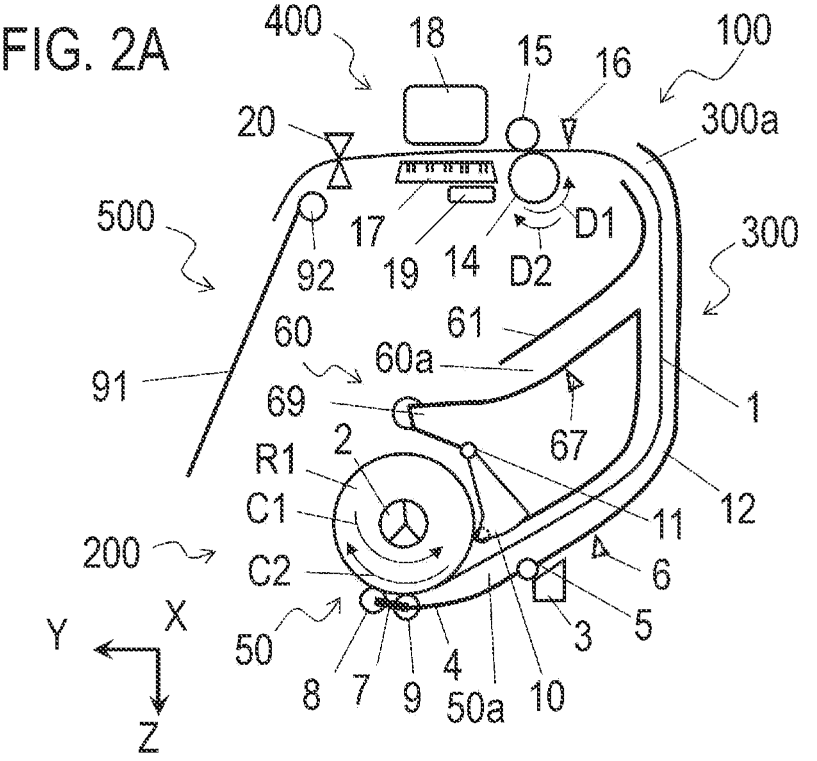
FIGS. 2A and 2B are explanatory diagrams of a conveyance path of a sheet according to the First Embodiment.
Figure 2B:
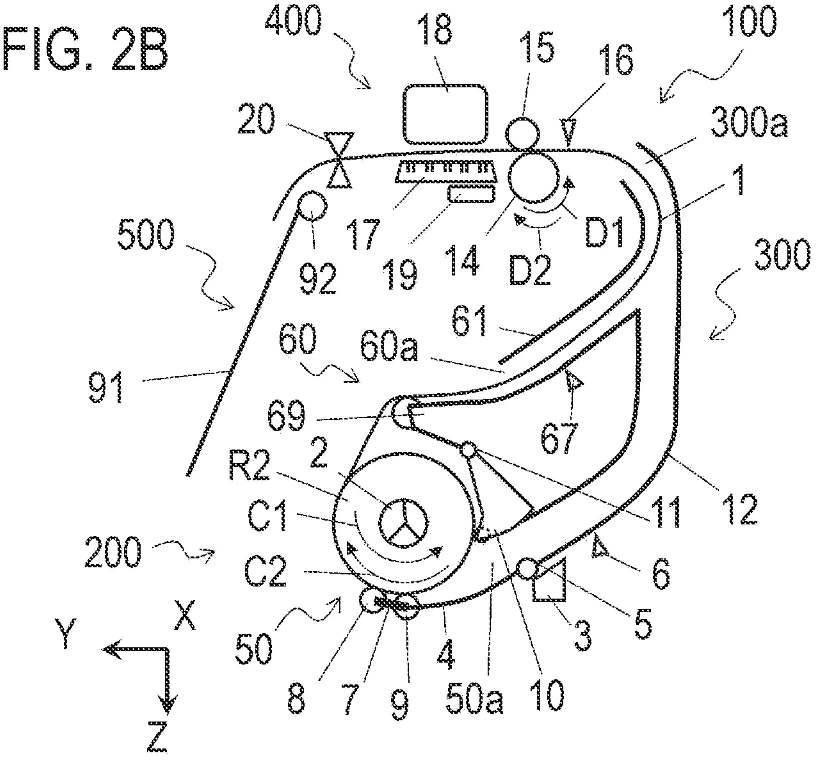

FIGS. 2A and 2B are schematic sectional diagrams of essential parts of the print device 100 and illustrate a conveyance path of the sheet 1. FIG. 2A illustrates a state in which the sheet 1 pulled out of the outward-wound roll sheet R1 is supplied and conveyed. Moreover, FIG. 2B illustrates a state in which the sheet 1 pulled out of the inward-wound roll sheet R2 is supplied and conveyed. The print device 100 further includes a conveying portion 300 (conveyance mechanism) which conveys the sheet 1 supplied from the supply device 200 and the print portion 400 which prints an image on the sheet 1 conveyed from the conveying portion 300. The supply device 200 and the winding device 600 are located on a lower part in the vertical direction with respect to the conveying portion 300 and the print portion 400. The sheet 1 supplied from the supply device 200 is wound by the winding device 600 via the conveying portion 300, the print portion 400, and the paper-ejection guide portion 500. It is to be noted that, in the First Embodiment, the supply device 200 and the conveying portion 300 are explained separately, but the conveying portion 300 can be regarded as the conveyance mechanism of the supply device 200, which is the sheet supply device.

In the supply device 200, a first sheet-supply portion 50 for pulling out the sheet 1 from the outward-wound roll sheet R1 and supplying it and a second sheet-supply portion 60 for pulling out the sheet 1 from the inward-wound roll sheet R2 and supplying it are disposed. The first sheet-supply portion 50 for outward-winding is located on the lower part in the vertical direction with respect to a rotation center of the roll sheet R set in the supply device 200 and pulls out the sheet 1 from the outward-wound roll sheet R1 and supplies it to the conveying portion 300. At this time, the sheet 1 is guided by a conveyance guide 12 and conveyed to the print portion 400 by the conveying portion 300. The second sheet-supply portion 60 for the inward-winding is located on an upper side in the vertical direction with respect to the rotation center of the roll sheet R set in the supply device 200 and pulls out the sheet 1 from the inward-wound roll sheet R2 and supplies it to the conveying portion 300. At this time, the sheet 1 is guided by a conveyance guide 61 and conveyed to the print portion 400 by the conveying portion 300.

In a hollow hole portion of the roll sheet R, a shaft-shaped spool member 2 is inserted and is mounted, and the roll sheet R is supported by the supply device 200 via the spool member 2, The spool member 2 is mounted on the roll sheet R so as to protrude from both end parts in the axial direction of the roll sheet R. When the spool member 2 is set in the supply device 200, it is drive-connected to a drive source such as a roll-drive motor or the like and is drive-rotated forward and backward. Then, the spool member 2 holding a center part of the roll sheet R is supported integrally with the roll sheet R by the supply device 200 capable of forward rotation and backward rotation. FIG. 2A illustrates an arrow C1 direction as a first direction and an arrow C2 direction as a second direction in which the roll sheet R is rotated.

The first sheet-supply portion 50 for outward-winding includes a drive portion 3, an arm member (guide member)

4 rotationally moving around a rotation shaft 5, a swing member 7, driven rotating members (contact bodies) 8, 9, a separation flapper 10 which rotationally moves around a rotation shaft 11, and a first sheet-detection sensor 6. Moreover, the second sheet-supply portion 60 for inward-winding includes a supply guide 69 which guides the sheet 1 from below, a conveyance guide 61 which is located on a downstream side of the supply guide 69 in the sheet conveying direction and guides both surfaces of the sheet 1, and a second sheet-detection sensor 67. Detailed configurations of the first sheet-supply portion 50 and the second sheet-supply portion 60 will be described later.

The conveying portion 300 includes a conveyance guide 12, a conveyance roller 14, a nip roller 15, and a third sheet-detection sensor 16. The conveyance guide 12 leads the sheet 1 to the print portion 400 while guiding both surfaces of the sheet 1 pulled out of the roll sheet R supported by the support portion (roll set portion) of the supply device 200. The conveyance roller 14 is rotated forward and backward in arrow D1, D2 directions (see FIG. 2A) by a roller-drive motor 35 (see FIG. 9). The nip roller 15 is capable of driven-rotation in accordance with rotation of the conveyance roller 14, is capable of contact/separation with respect to the conveyance roller 14 by a nip-roller separation motor, not shown, and is capable of adjustment of a nip force. The conveyance roller 14 is rotated when the third sheet-detection sensor 16 detects a leading end of the sheet 1. A conveyance speed of the sheet 1 by the conveyance roller 14 is set higher than a pulling-out speed of the sheet 1 by the rotation of the roll sheet R. That is, the sheet 1 is given a back tension, and conveyance is performed in a state tensed in the conveying direction. As a result, sagging of the sheet 1 is prevented, and occurrence of folding of the sheet 1 and occurrence of a conveyance error can be suppressed.

The print portion 400 includes a print head 18, a platen 17, a suction fan 19, and a cutter 20. The platen 17 adsorbs a rear surface (a surface on a side opposite to the print surface P) of the sheet 1 through a suction hole provided in the platen 17 by a negative pressure generated by the suction fan 19. As a result, a position of the sheet 1 is regulated so as to follow on the platen 17, and an image is printed by the print head 18 on the sheet 1 with high accuracy. The cutter 20 is configured to be located on the downstream side of the print head 18 in the conveying direction of the sheet t and capable of cutting off the sheet 1 on which the image is printed.

The paper-ejection guide portion 500 includes a paper-ejection guide 91 and a rotation shaft 92, The paper-ejection guide 91 is a guide member which leads the sheet 1 to the winding device 600 while guiding the rear surface (the surface on the side opposite to the print surface P) of the sheet 1 pulled out of the print portion 400. The sheet 1 pulled out of the print portion 400 passes on an outer side of the print device 100 by the paper-ejection guide 91 and is wound up by the winding device 600. The paper-ejection guide 91 is configured to be capable of rotational movement around the rotation shaft 92. By means of the configuration as above, when the roll sheet R is attached to/removed from the supply device 200, the roll sheet R can be attached/removed without interfering with the paper-ejection guide portion 500 by rotationally moving the paper-ejection guide 91 and causing it to retreat upward.

Spool Member 2

Subsequently, the spool member 2 mounted on the roll sheet R when the roll sheet R is set in the supply device 200 will be explained. FIGS. 3A 3B, 3C, 3D, 3E, 3F, and 3G are explanatory diagrams of the spool member 2.

Figure 3A:
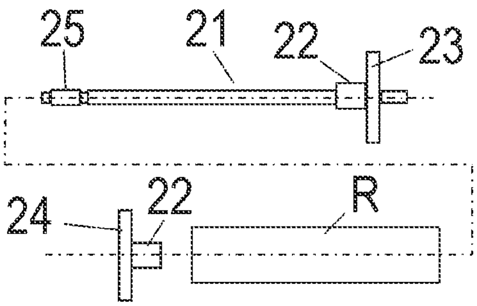
FIGS. 3A to 3G are explanatory diagrams of a spool member according to the First Embodiment.
Figure 3B:
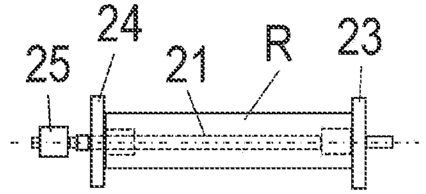

FIG. 3A is an exploded diagram of the roll sheet R and the spool member 2. FIG. 3B is a diagram illustrating a state where the spool member 2 is mounted on the roll sheet R. The spool member 2 includes a spool shaft 21, a friction member 22, a reference flange 23, anon-reference flange 24, and a spool gear 25. The reference flange 23 is provided on one end part in an axial direction of the spool shaft 21, and the spool gear 25 for rotating the spool shaft 21 is provided on the other end part on a side opposite to the one end part. A reference side in the axial direction of the spool member 2 on which the reference flange 23 is provided is a side to be a reference of positioning in the axial direction of the roll sheet R and the spool member 2 with respect to the supply device 200.

On the reference flange 23 and the non-reference flange 24, a friction member 22 in contact with an inner peripheral surface of the roll sheet R is provided. Moreover, the non-reference flange 24 is configured to be removable integrally with the friction member 22 with respect to the spool shaft 21. When the spool member 2 is mounted on the roll sheet R, in the axial direction of the spool member 2, the friction member 22 is located between the reference flange 23 and the non-reference flange 24, and the spool gear 25 is located on an end part on the non-reference side with respect to the non-reference flange 24.

Outer diameters of the reference flange 23 and the non-reference flange 24 are formed larger than an outer diameter of the roll sheet R. The spool member 2 is mounted on the roll sheet R in a state where one end of the roll sheet R is in contact with the reference flange 23, and the other end of the roll sheet R is in contact with the non-reference flange 24.

In mounting of the spool member 2 on the roll sheet R, in a state where the non-reference flange 24 to be fitted with the spool shaft 21 is removed, the spool shaft 21 is inserted into the hollow hole portion of the roll sheet R. An outer diameter of the spool shaft 21 is smaller than an inner diameter of the hollow hole portion of the roll sheet R, and a clearance is formed between the spool shaft 21 and the roll sheet R and thus, the user can insert the spool shaft 21 into the roll sheet R with a slight force.

In a state where the spool shaft 21 is inserted into the roll sheet R, and one end of the roll sheet R is in contact with the reference flange 23, the friction member 22 located closer to an inner side in the axial direction than the reference flange 23 is fitted in the hollow hole portion of the roll sheet R. Then, the friction member 22 is brought into contact with the inner peripheral surface of the roll sheet R, and the reference flange 23 is fixed to the roll sheet R. After that, by having the non-reference flange 24 passed through the spool shaft 21 so as to bring the other end of the roll sheet R into contact with the non-reference flange 24, the friction member 22 located closer to the inner side in the axial direction than the non-reference flange 24 is fitted in the hollow hole portion of the roll sheet R. Then, the non-reference flange 24 is fixed to the roll sheet R, and as shown in FIG. 3B, the spool member 2 is mounted on the roll sheet R.

Figure 3C:
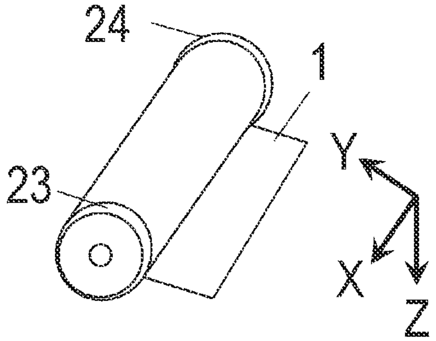
Figure 3D:
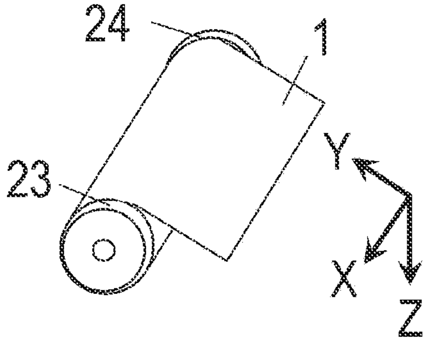
Figure 3E:
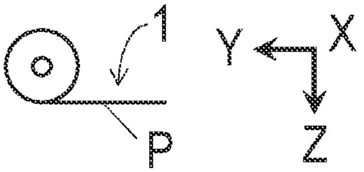
Figure 3F:
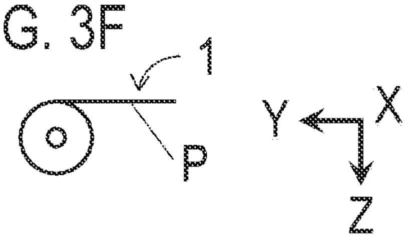

As described above, both the outward-wound roll sheet R1 and the inward-wound roll sheet R2 can be set in the supply device 200, and either of the roll sheets R can be mounted on the supply device 200 through the spool member 2. FIG. 3C is a perspective diagram illustrating a state where the sheet 1 is pulled out of the outward-wound roll sheet R1 set in the supply device 200. FIG. 3D is a perspective diagram illustrating a state where the sheet 1 is pulled out of the inward-wound roll sheet R2 set in the supply device 200. FIG. 3E is a sectional view illustrating a state where the sheet 1 is pulled out of the outward-wound roll sheet R1 set in the supply device 200. FIG. 3F is a sectional view illustrating a state where the sheet 1 is pulled out of the inward-wound roll sheet R2 set in the supply device 200.

In the outward-wound roll sheet R1, the sheet 1 is wound so that the print surface P faces the outer side. And when the outward-wound roll sheet R1 is set in the supply device 200, the sheet 1 is pulled out from the lower part in the vertical direction with respect to the rotation center of the outward-wound roll sheet R1 and is supplied to the conveying portion 300. In the inward-wound roll sheet R2, the sheet 1 is wound so that the print surface P faces the inner side. And when the outward-wound roll sheet R1 is set in the supply device 200, the sheet 1 is pulled out from the lower part in the vertical direction with respect to the rotation center of the outward-wound roll sheet R1 and is supplied to the conveying portion 300. That is, even when either of the roll sheets R is set, the sheet 1 is pulled out of the roll sheet R and is supplied so that the print surface P faces downward in the vertical direction.

Figure 3G:
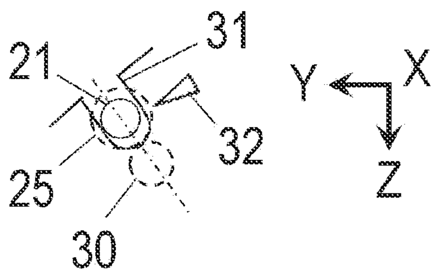

The supply device 200 includes a drive gear 30, a spool holder 31, and a roll sensor 32. FIG. 3G is a diagram illustrating a state where an end part of the spool member 2 is fitted in the spool holder 31 of the support portion of the supply device 200. The spool holder 31 is provided at a position corresponding to each of both end parts in the axial direction of the spool shaft 21. An inner surface of the spool holder 31 is formed having a U-shape, and the end part of the spool shaft 21 can be fitted through an opening part side thereof. In a state where the spool member 2 is fitted in the spool holder 31, the spool gear 25 is connected to a roll-drive motor 33, which is a drive source, via the drive gear 30 provided in the supply device 200.

When the roll sheet R is rotated/driven together with the spool member 2 by the roll-drive motor 33, a supply operation of the sheet 1 is made possible. The roll sensor 32 detects presence/absence of the roll sheet R in the support portion.

Subsequently, a detailed configuration of the supply device 200, which is a sheet supply device for supplying the sheet 1 from the set roll sheet R, will be explained. As described above, the supply device 200 has the first sheet-supply portion 50, which is a first supply portion for supplying the sheet 1 from the outward-wound roll sheet R1, and the second sheet-supply portion 60, which is a second supply portion for supplying the sheet 1 from the inward-wound roll sheet R2. The first sheet-supply portion 50 has a first supply path 50*a* to which the sheet 1 is supplied, and the second sheet-supply portion 60 has a second supply path 60*a* to which the sheet 1 is supplied. The first supply path 50*a* and the second supply path 60*a* are both connected to a conveyance path 300*a* of the conveying portion 300, the sheet 1 is supplied to the first supply path 50*a* or the second supply path 60*a*, passes through the conveyance path 300*a*, and is supplied to the print portion 400.

First Sheet-Supply Portion 50

Figure 4A:
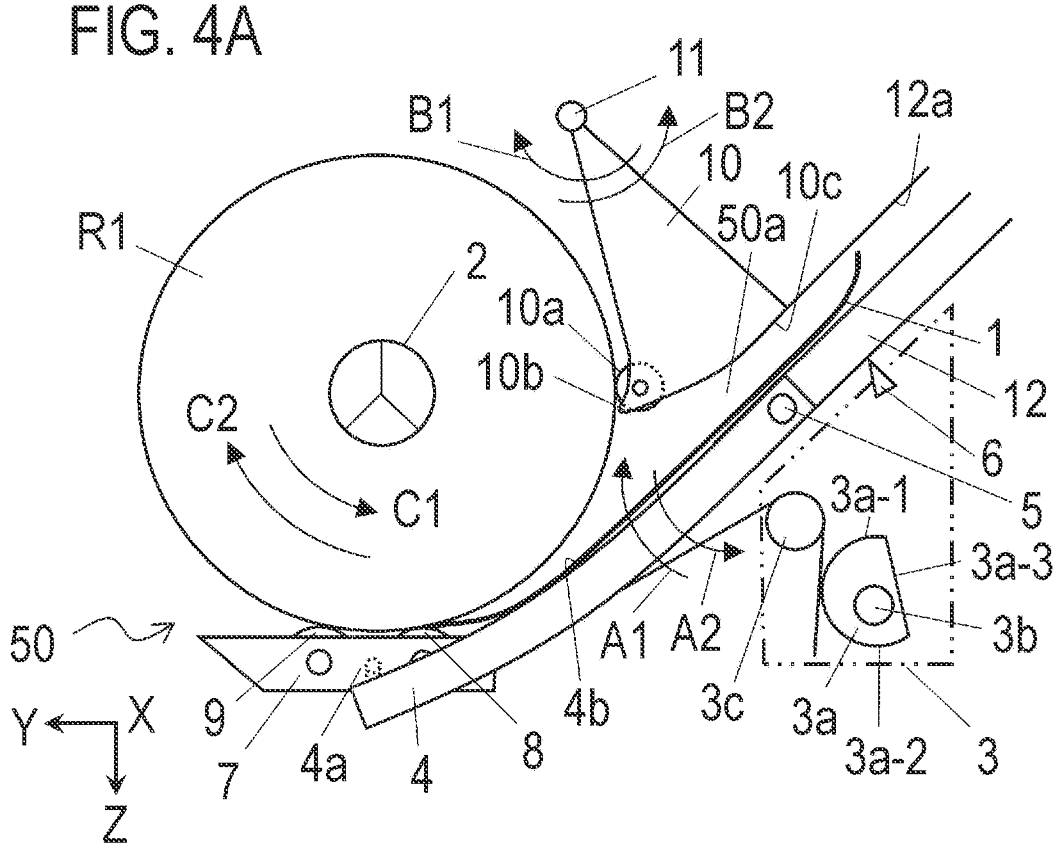
FIGS. 4A and 4B are explanatory diagrams of a sheet supply portion for outward-winding according to the First Embodiment.
Figure 4B:
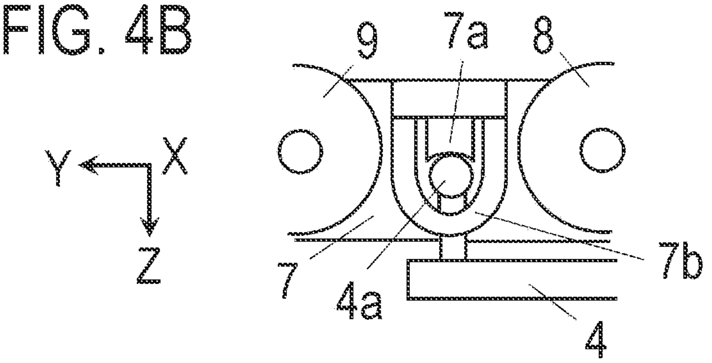

First, the first sheet-supply portion 50 which pulls out the sheet 1 from the outward-wound roll sheet R1 and supplies it will be explained. The first sheet-supply portion 50 includes the drive portion 3 and the arm member 4 capable of rotational movement around the rotation shaft 5 extending in a rotary shaft direction of the roll sheet R set in the supply device 200. Moreover, the first sheet-supply portion 50 includes the swing member 7 which is supported by the arm member 4 and capable of swing, the driven rotating members 8, 9 which are supported by the swing member 7 and capable of being brought into contact with the roll sheet R, and the separation flapper 10 which is capable of rotational movement around the rotation shaft 11 extending in a direction parallel to the rotation shaft 5. FIG. 4A is an explanatory diagram of the first sheet-supply portion 50 for outward-winding, and FIG. 4B is an enlarged diagram of a connection part between the arm member 4 and the swing member 7. The roll sheet R shown in FIG. 4A is the outward-wound roll sheet R1 and it is in a state where the outer diameter thereof is relatively large.

Arm Member 4

The arm member 4 is configured to be capable of rotational movement in arrow A1, A2 directions around the rotation shaft 5 and is rotationally moved by the drive portion 3. The arm member 4 has a shaft portion 4*a* engaged with the swing member 7 and a guide portion 4*b* which guides the sheet 1 pulled out of the roll sheet R from below. The guide portion 4*b* is formed on an upper part of the arm member 4, and the arm member 4 functions as a guide member at the supply of the sheet 1 from the outward-wound roll sheet R1.

The drive portion 3 has a rotation cam 3*a*, a rotary shaft 3*b* which rotatably supports the rotation cam 3*a*, and a torsion coil spring 3*c* which presses the arm member 4 in accordance with rotation of the rotation cam 3*a*. The torsion coil spring 3*c* is located between the arm member 4 and the rotation cam 3*a* of the drive portion 3 and presses the arm member 4 in the arrow A1 direction from below.

In the first sheet-supply portion 50, when the rotation cam 3*a* is rotated by a cam-drive motor 34 (see FIG. 9), the force by which the torsion coil spring 3*c* presses the arm member 4 in the arrow A1 direction changes. In the First Embodiment, the first sheet-supply portion 50 is configured capable of switching to three stages, that is, a strong nip state, a weak nip state, and a nip released state (separated state) by changing the state of the arm member 4.

The strong nip state is a state where the arm member 4 is pressed by the torsion coil spring 3*c* of the drive portion 3 with a predetermined "pressing force of strong nip", and the driven rotating members 8, 9 mounted at a distal end of the arm member 4 through the swing member 7 are in pressure contact with the roll sheet R. At this time, a part 3*a*-1 width a relatively large diameter of the rotation cam 3*a* is brought into contact with the torsion coil spring 3*c*, and the pressing force of the torsion coil spring 3*c* pressing the arm member 4 becomes larger, and the arm member 4 is pressed by the "pressing force of strong nip".

The weak nip state is a state where the arm member 4 is pressed by the torsion coil spring 3*c* of the drive portion 3 with a predetermined "pressing force of weak nip", and the driven rotating members 8, 9 are in pressure contact with the roll sheet R. At this time, when a part 3*a*-2 with a relatively small diameter of the rotation cam 3*a* is brought into contact with the torsion coil spring 3*c*, the pressing force of the torsion coil spring 3*c* pressing the arm member 4 becomes smaller, and the arm member 4 is pressed by the "pressing force of weak nip".

The separated state is a state in which the arm member 4 is not pressed by the torsion coil spring 3*c*, the driven rotating members 8, 9 are separated from the roll sheet R, and the pressing force to the roll sheet R is released. At this time, such a state is brought about that a planar part 3*a*-3 of the rotation cam 3*a* is brought into contact with the torsion coil spring 3c, the arm member 4 is not pressed by the drive portion 3 to the arrow A1 direction, and the pressing force is released.

The swing member 7 is mounted on the arm member 4 and is configured capable of swing with respect to the arm member 4. The driven rotating members 8, 9 are mounted rotatably on the swing member 7, and the driven rotating member 8 is located with a shift in a circumferential direction of the roll sheet R with respect to the driven rotating member 9. These driven rotating members 8, 9 are brought into pressure contact with an outer peripheral part of the roll sheet R from below in the vertical direction when the arm member 4 is pressed in the arrow A1 direction. Therefore, the drive portion 3 functions as a pressing mechanism for pressing the arm member 4. Moreover, the drive portion 3 also functions as a movement mechanism for moving the arm member 4 so that the driven rotating members 8, 9 approach or are separated from the outer peripheral part of the roll sheet R.

As described above, the driven rotating members 8, 9 are contact bodies to be brought into pressure contact with the outer peripheral part of the roll sheet R from below the rotation center in the vertical direction of the roll sheet R. A pressure contact force with which the driven rotating members 8, 9 exert for pressure contacting the roll sheet R is changed in accordance with the pressing force with which the drive portion 3 presses the arm member 4. When the arm member 4 is pressed with the "pressing force of strong nip", and the first sheet-supply portion 50 is in the strong nip state, the driven rotating members 8, 9 are brought into pressure contact most strongly with the roll sheet R. When the arm member 4 is pressed with the "pressing force of weak nip", and the first sheet-supply portion 50 is in the weak nip state, the driven rotating members 8, 9 are brought into pressure contact weakly with the roll sheet R as compared with the strong nip state. And when the arm member 4 is not pressed, and the first sheet-supply portion 50 is in the nip released state, the driven rotating members 8, 9 are separated from the roll sheet R.

Figure 5A:
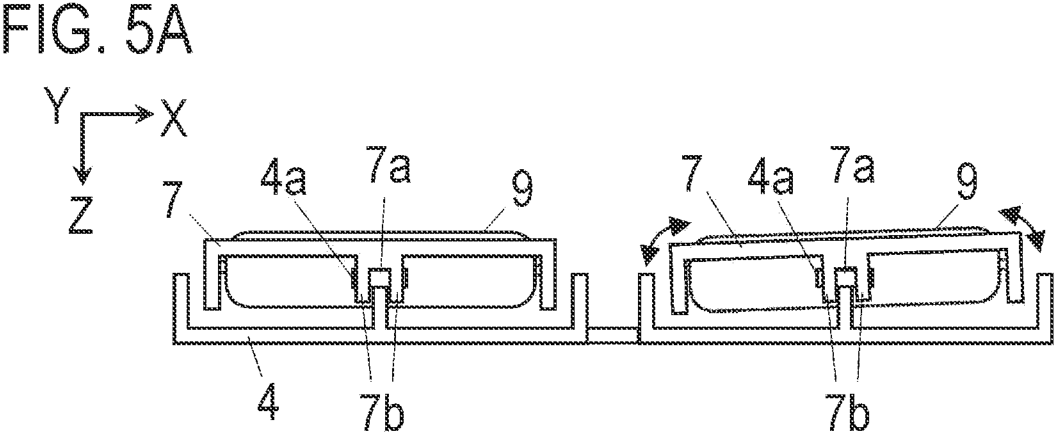
FIGS. 5A and 5B are explanatory diagrams of an equalization mechanism of the sheet supply portion according to the First Embodiment.
Figure 5B:
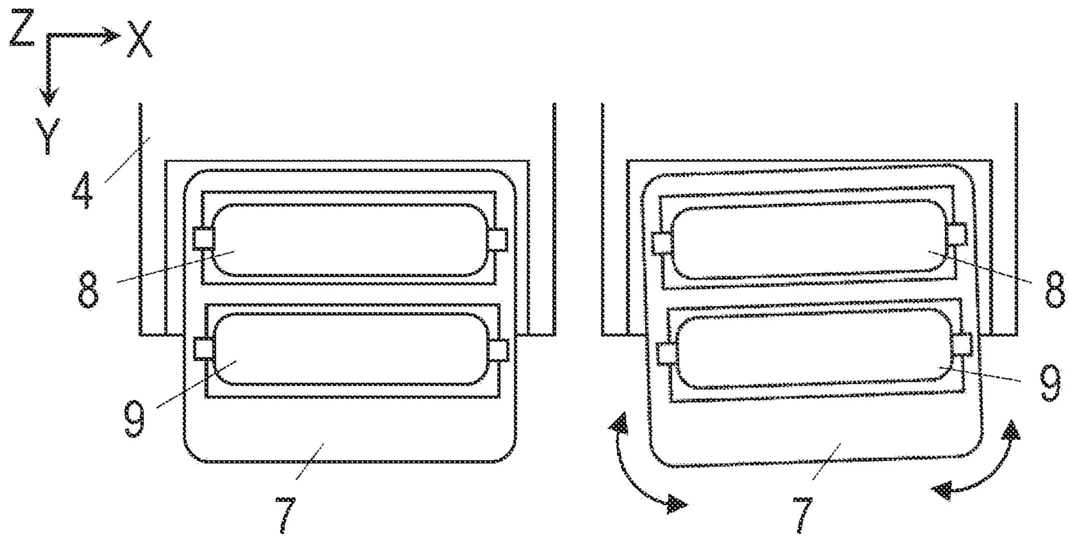

In the First Embodiment, the plurality of swing members 7 are disposed by being aligned in the width direction (X-axis direction) of the roll sheet R. FIG. 5A is a front view illustrating the plurality of swing members 7, and FIG. 5B is a top view illustrating the plurality of swing members 7. The swing member 7 has a bearing portion 7a and a shaft fastening portion 7b and is supported by the arm member 4.

As shown in FIG. 4B, the bearing portion 7a contacts the shaft portion 4a from above in the vertical direction. The shaft fastening portion 7b is formed having a U-shape whose upper part is open when viewed from the axial direction of the shaft portion 4a, and the shaft portion 4a is located inside thereof. In a state where the swing member 7 is stably supported, the bearing portion 7a is provided so that, when viewed from the axial direction of the shaft portion 4a, a predetermined interval is provided in the vertical direction and the horizontal direction with respect to the shaft portion 4a. Moreover, as shown in FIG. 5A, two pieces of the shaft fastening portions 7b are provided in the swing member 7, and the two shaft fastening portions 7b are provided so as to oppose each other in the axial direction of the shaft portion 4a and are located at both end parts in the axial direction of the shaft portion 4a. By means of the configuration as above, the shaft fastening portion 7b regulates a range of rattling of the shaft portion 4a and prevents removal of the shaft portion 4a.

When the shaft portion 4a is to be accepted between the bearing portion 7a and the shaft fastening portion 7b, the shaft fastening portion 7b is elastically deformed so that a distance between the two shaft fastening portions 7b located at both end parts in the axial direction of the shaft portion 4a is widened. And in a state where the distance between the two shaft fastening portions 7b becomes longer than an entire length of the shaft portion 4a, the shaft portion 4a is accepted between the bearing portion 7a and the shaft fastening portion 7b. When the shaft fastening portion 7b is elastically recovered in the state where the shaft portion 4a is located between the bearing portion 7a and the shaft fastening portion 7b, removal of the shaft portion 4a from the swing member 7 is prevented. The shaft fastening portion 7b can be formed by a resin material capable of elastic deformation, for example.

The bearing portion 7a is provided at a gravity-center position of the swing member 7 and is supported by the shaft portion 4a so that the swing member 7 can take a stable attitude in each direction of the X-axis, the Y-axis, and the Z-axis. That is, as the swing member 7 shown on the left sides in FIGS. 5A and 5B, the swing member 7 is supported in the stable attitude in each direction of the X-axis, the Y-axis, and the Z-axis. Moreover, since it is configured that the shaft portion 4a is accepted with rattling, the swing member 7 is equalized so as to follow the outer peripheral part of the roll sheet R by the pressing force in the arrow A1 direction to the arm member 4 as the swing member 7 shown on the right sides in FIGS. 5A and 5B. By means of the configuration as above (equalization mechanism), the change in the pressure-contact attitudes of the driven rotating members 8, 9 with respect to the outer peripheral part of the roll sheet R is allowed. As a result, a contact region between the sheet 1 and the driven rotating members 8, 9 is kept to the maximum all the time, and the pressing force to the sheet 1 is equalized so that variation in a conveying force of the sheet 1 can be suppressed. By means of the pressure contact of the driven rotating members 8, 9 with the outer peripheral part of the roll sheet R, occurrence of sagging of the sheet 1 is suppressed, and the conveying force is reinforced. The driven rotating member 8 contributes mainly to reinforcement of the conveying force of the sheet 1, and the driven rotating member 9 contributes mainly to suppression of the occurrence of the sagging of the sheet 1.

The shaft portion 4a is a shaft extending in the X-axis direction and having a circular section, and a groove extending in the X-axis direction and having a U-shaped section recessed upward is formed in a lower surface of the bearing portion 7a. When an upper part of the shaft portion 4a is stably fitted in the groove in the lower part of the bearing portion 7a, such a force acts that the swing member 7 returns to the stable attitude.

It is to be noted that the equalization mechanism applied to the first sheet-supply portion 50 is not limited to the aforementioned configuration, but in order to allow a change in the pressure contact attitude of the driven rotating members 8, 9 with respect to the outer peripheral part of the roll sheet R, other well-known mechanisms may be applied. Moreover, in the First Embodiment, the equalization mechanism is provided at the connection part between the swing member 7 and the arm member 4, but the equalization mechanism may be provided at the connection part between the arm member 4 and the conveyance guide 12.

Moreover, in the First Embodiment, the swing members 7 are disposed in plural at intervals in the width direction of the roll sheet R. And in the width direction of the roll sheet R, in accordance with the width of the roll sheet R, the position of the non-reference flange 24 can be changed with the position of the reference flange 23 as a reference. Thus, when the roll sheet R is to be set, if the non-reference flange 24 is at a position interfering with the swing member 7, the position of the non-reference flange 24 is changed so as to be located between the two swing members 7 adjacent to each other, for example. As a result, interference between the swing member 7 and the non-reference flange 24 can be avoided.

Separation Flapper 10

The separation flapper 10 has a driven roller 10*a*, a separating portion 10*b*, and a guide surface 10*c* and is configured capable of rotational movement in arrow B1, B2 directions around the rotation shaft 11. The separation flapper 10 is provided in order to separate the leading end of the sheet from the outward-wound roll sheet R1 and is mounted on a main body (printer main body) of the print device 100. The rotation shaft 11 supports an upper end part of the separation flapper 10, and the separation flapper 10 is located above the arm member 4 and is configured to slightly press the roll sheet R with its own weight. If it is necessary to further strongly press the roll sheet R, an urging member such as a spring which applies an urging force may be provided.

The driven roller 10*a* is provided rotatably at a distal end part of the separation flapper 10 and is brought into contact with the roll sheet R. Since the rotatable driven roller 10*a* is brought into contact with the roll sheet R, an influence of the pressing force on the sheet 1 of the roll sheet R by the separation flapper 10 can be suppressed. Moreover, the separating portion 10*b* is provided in the vicinity of the driven roller 10*a* and at the distal end of the separation flapper 10. The separating portion 10*b* is formed such that it gets closer to the surface of the roll sheet R as much as possible, when the driven roller 10*a* is in contact with the roll sheet R. By means of the configuration as above, when the outward-wound roll sheet R1 is set, the leading end of the sheet 1 can be separated easily from the outward-wound roll sheet Rt. The guide surface 10*c* is a surface facing the lower part of the separation flapper 10 and guides an upper surface of the sheet 1 to be supplied, That is, the separation flapper 10 functions also as a guide member which guides the sheet 1 at the supply of the sheet 1.

First Supply Path 50*a*

In the First Embodiment, the first supply path 50*a* of the first sheet-supply portion 50 is constituted by the arm member 4 and the separation flapper 10. The sheet 1 pulled out of the outward-wound roll sheet R1 is supplied to the first supply path 50*a* passing above the driven rotating members 8, 9. The first supply path 50*a* is connected to the conveyance path 300*a* formed by the conveyance guide 12 of the conveying portion 300, and the sheet 1 is conveyed to the print portion 400 by passing through the first supply path 50*a* and the conveyance path 300*a*.

The sheet 1 pulled out of the outward-wound roll sheet R1 is supplied through the first supply path 50*a* formed by the separation flapper 10 and the arm member 4 by having its lower surface guided by the guide portion 4*b* of the arm member 4. A sheet supply port (inlet) of the first supply path 50*a* is located in the lower part with respect to the rotation center of the roll sheet R supported in the supply device 200. As described above, in the first sheet-supply portion 50, the driven rotating members 8, 9 are brought into pressure contact with the outer peripheral part of the outward-wound roll sheet R1 from below, and the lower surface of the sheet 1 pulled out by passing above the driven rotating members 8, 9 is guided by the guide portion 4*b*. As a result, the sheet 1 can be supplied smoothly by using an own weight of the sheet 1. Moreover, by means of movement of the driven rotating members 8, 9 and the guide portion 4*b* in accordance with the outer diameter of the outward-wound roll sheet R1, the sheet 1 can be reliably pulled out of the outward-wound roll sheet R1 and conveyed regardless of the outer diameter of the outward-wound roll sheet R1.

The sheet 1 pulled out of the outward-wound roll sheet R1 passes below the guide surface 10*c* of the separation flapper 10 and then, passes below the lower surface 12*a* of the conveyance guide 12 of the conveying portion 300. When viewed from the axial direction of the rotation shaft 11, the guide surface 10*c* of the separation flapper 10 has a curved shape so as to follow a virtual circle around the rotation shaft 11 as a center. Moreover, the lower surface 12*a* is formed having a shape so as to follow the virtual circle around the rotation shaft 11 as the center when viewed from the axial direction of the rotation shaft 11. By means of the configuration as above, a supply path without a step is formed between the guide surface 10*c* and the lower surface 12*a* regardless of the rotational movement position in the arrow B1, B2 directions of the separation flapper 10, and occurrence of being caught of the leading end of in the sheet 1 in the supply path is suppressed.

Figure 6:
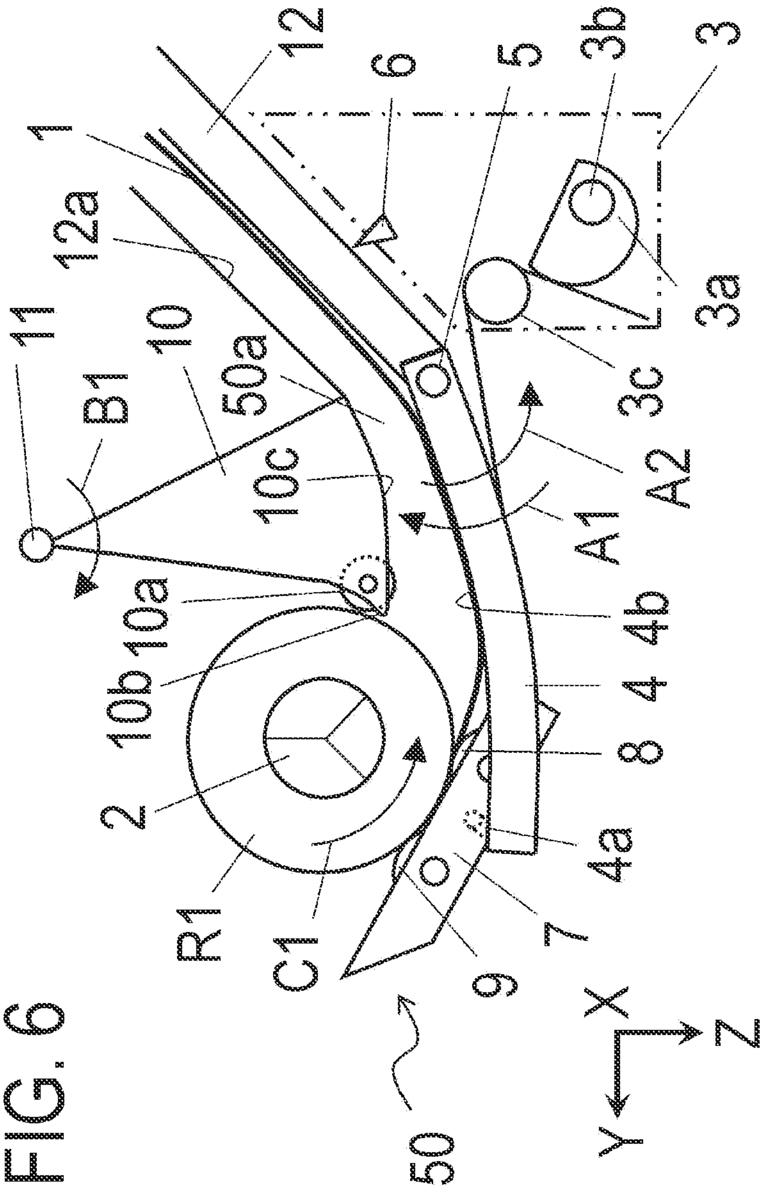
FIG. 6 is an explanatory diagram of a supply device in which a small-diameter roll is set according to the First Embodiment.

FIG. 6 is an explanatory diagram of the first sheet-supply portion 50 for outward-winding of the supply device 200 in which the roll sheet R with a relatively small outer diameter is set. The roll sheet R shown in FIG. 6 is the outward-wound roll sheet R1, and its outer diameter is relatively small and smaller than the outer diameter of the roll sheet R shown in FIG. 4A.

The arm member 4 is pressed by the torsion coil spring 3*c* in the arrow A1 direction all the time and thus, it rotationally moves in the arrow A1 direction in accordance with the decrease in the outer diameter of the outward-wound roll sheet R1. Moreover, since the separation flapper 10 is also to rotationally move by its own weight in the arrow B1 direction all the time, it rotationally moves in the arrow B1 direction in accordance with the decrease in the outer diameter of the outward-wound roll sheet R1. As a result, even if the outer diameter of the outward-wound roll sheet R1 becomes small, the supply path of the sheet 1 is formed by the arm member 4, the separation flapper 10, and the conveyance guide 12. And by means of the guide portion 4*b* of the arm member 4 and the guide surface 10*c* of the separation flapper 10, the upper surface and the lower surface of the sheet 1 are guided. As described above, since the arm member 4 and the separation flapper 10 are configured capable of rotational movement in accordance with the change in the outer diameter of the roll sheet R, the supply path of a substantially constant size is formed between them regardless of the outer diameter of the roll sheet R. As a result, the sheet 1 with low stiffness can be reliably supplied without buckling.

Moreover, when the arm member 4 is rotationally moved in the arrow A1 direction in accordance with a decrease of the outer diameter of the outward-wound roll sheet R1, the driven rotating members 8, 9, which are contact bodies, are brought into pressure contact with the outward-wound roll sheet R1 all the time. As a result, regardless of the outer diameter of the roll sheet R, occurrence of sagging of the sheet 1 is suppressed, and the conveying force of the sheet 1 is reinforced.

Second Sheet-Supply Portion 60

Figure 7:
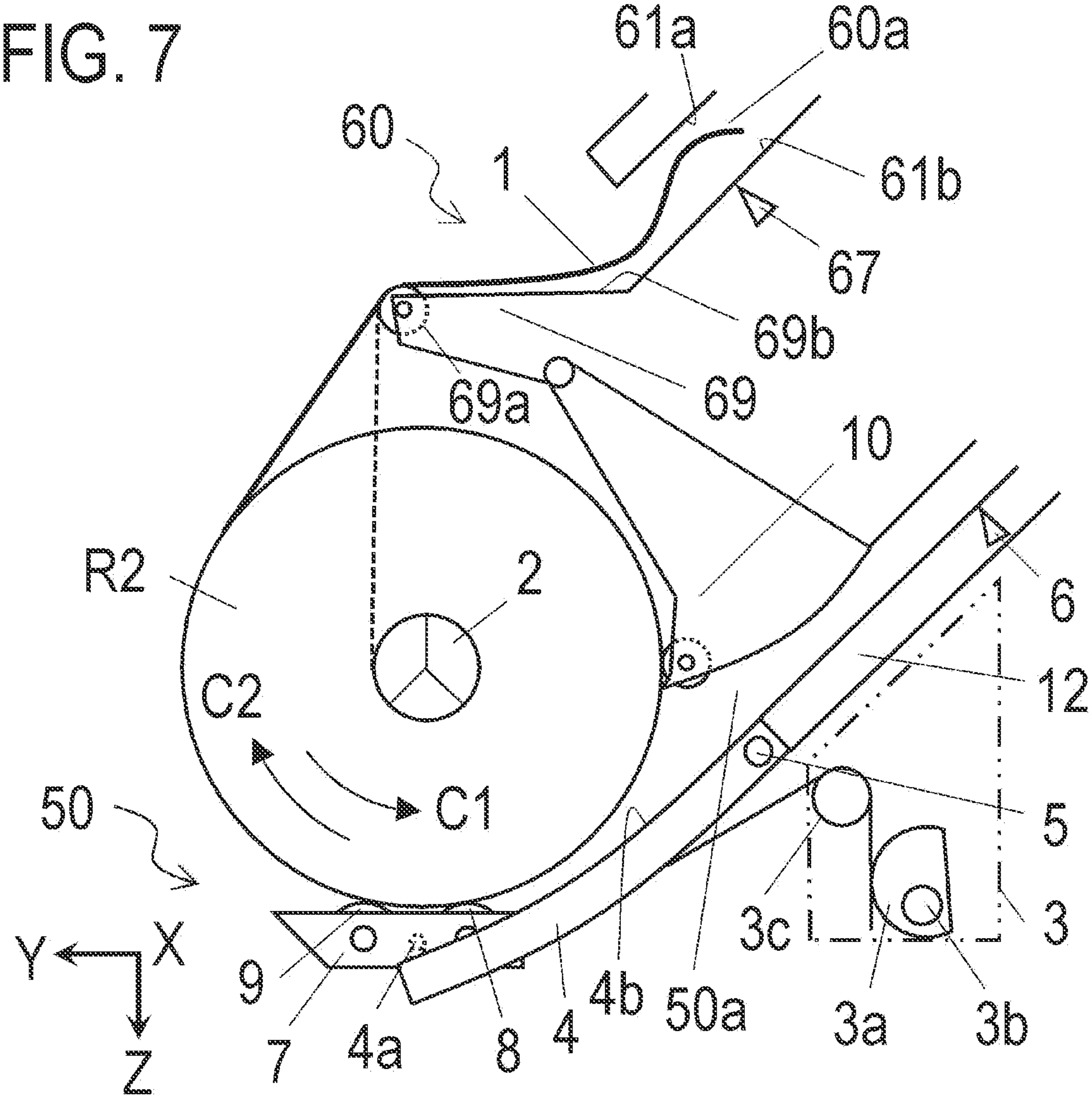
FIG. 7 is an explanatory diagram of the sheet supply portion for inward-winding according to the First Embodiment.

Subsequently, the second sheet-supply portion 60 which pulls the sheet 1 out of the inward-wound roll sheet R2 and supplies it will be explained. The second sheet-supply portion 60 includes the supply guide 69 located above the roll sheet R set in the supply device 200, the conveyance guide 61 located on the downstream side of the supply guide 69 in the supply direction of the sheet 1, and the second sheet-detection sensor 67. FIG. 7 is an explanatory diagram of the second sheet-supply portion 60 for inward-winding. The roll sheet R shown in FIG. 7 is the inward-wound roll sheet R2. In the First Embodiment, a work of pulling the sheet 1 out of the inward-wound roll sheet R2 is performed manually.

The supply guide 69 has a lower guide portion 69*b* which guides the sheet 1 pulled out of the inward-wound roll sheet R2 from below when the inward-wound roll sheet R2 is to be supplied manually to the conveyance guide 61. That is, the user pulls the sheet 1 out of the inward-wound roll sheet R2 upward and supplies it onto the supply guide 69. On the other hand, an upper part of the supply guide 69 is open, and a space for the user to manually supply the sheet 1 is formed. By means of the configuration as above, the supply guide 69 becomes a spot where the hand is placed when the sheet 1 is fed while pressing it when the sheet 1 is manually fed, and the user can easily feed in the sheet. That is, the second sheet-supply portion 60 has a configuration with excellent operability when the user manually supplies the sheet 1. It is to be noted that a driven roller member may be provided on the lower guide portion 69*b* in order to improve slidability of the surface of the supply guide 69 and to reduce an operating force when the user feeds in the sheet 1.

In the supply direction of the sheet 1, a driven roller 69*a* is provided at a distal end part on the upstream side of the supply guide 69. The driven roller 69*a* is provided capable of driven-rotation in accordance with the movement of the sheet 1 so as to reduce the operating force when the user feeds the sheet 1 into the conveyance guide 61. Moreover, when the print device 100 pulls the roll sheet R in the print operation or the like, the sheet 1 is strongly pressed onto the supply guide 69 and the driven roller 69*a*, but by means of smooth rotation of the driven roller 69*a*, strong friction between the surface of the sheet 1 and the supply guide 69 is prevented. As a result, damage on the sheet 1 by the driven roller 69*a* which could occur during the print operation or the like can be suppressed. Moreover, the driven roller 69*a* protrudes to the upstream side in the supply direction (Y-axis direction) of the sheet 1 with respect to the supply guide 69, and even when a remaining amount of the roll sheet R decreases, and the outer diameter of the roll sheet R becomes smaller, strong friction by the sheet 1 on the supply guide 69 is prevented. As a result, regardless of the remaining amount or the size of the outer diameter of the roll sheet R, the damage on the sheet 1 can be suppressed, and conveyance performance of the sheet 1 can be improved.

The conveyance guide 61 includes an upper guide portion 61*a* located on the upper side in the vertical direction with respect to the supplied sheet 1 and a lower guide portion 61*b* located in the lower part in the vertical direction with respect to the supplied sheet 1 and forms a supply path of the sheet 1. By configuring such that the sheet 1 can be guided from both sides in the vertical direction, even if stiffness of the sheet 1 is weak, the sheet 1 is led to the print portion 400 more reliably without buckling. The lower guide portion 61*b* is smoothly connected to the lower guide portion 69*b* of the supply guide 69, and the sheet 1 is conveyed without being caught by a boundary between the supply guide 69 and the conveyance guide 61.

In the conveyance guide 61, the second sheet-detection sensor 67 for inward-winding is provided, and the second sheet-supply portion 60 is configured capable of detecting passage of the leading end of the sheet 1 in the conveyance guide 61. The second sheet-detection sensor 67 may use a reflection-type photoelectronic sensor or may use a lever member. When the lever member is used for the second sheet-detection sensor 67, by configuring such that rotation and movement at the contact of the lever member provided in the conveyance guide 61 with the sheet 1 is detected by the sensor, presence/absence of the sheet 1 can be reliably detected regardless of a surface color of the sheet 1. By means of detection results of the second sheet-detection sensor 67 for inward-winding and the first sheet-detection sensor 6 for outward-winding, a CPU 201 can identify whether the roll sheet R set in the print device 100 is the outward-wound roll sheet R1 or the inward-wound roll sheet R2.

Second Supply Path 60*a*

The second supply path 60*a* of the second sheet-supply portion 60 to which the sheet 1 pulled out of the inward-wound roll sheet R2 set in the supply device 200 is supplied is constituted by the supply guide 69 and the conveyance guide 61. Specifically, the second supply path 60*a* is constituted by the lower guide portion 69*b* of the supply guide 69, the lower guide portion 61*b* of the conveyance guide 61, and the upper guide portion 61*a* of the conveyance guide 61. The second supply path 60*a* is connected to the conveyance path 300*a*, and the sheet 1 is conveyed to the print portion 400 by passing through the second supply path 60*a* and the conveyance path 300*a*. Moreover, a sheet supply port (inlet) of the second supply path 60*a* is located on the upper side with respect to the rotation center of the roll sheet R supported in the supply device 200.

Figure 8:
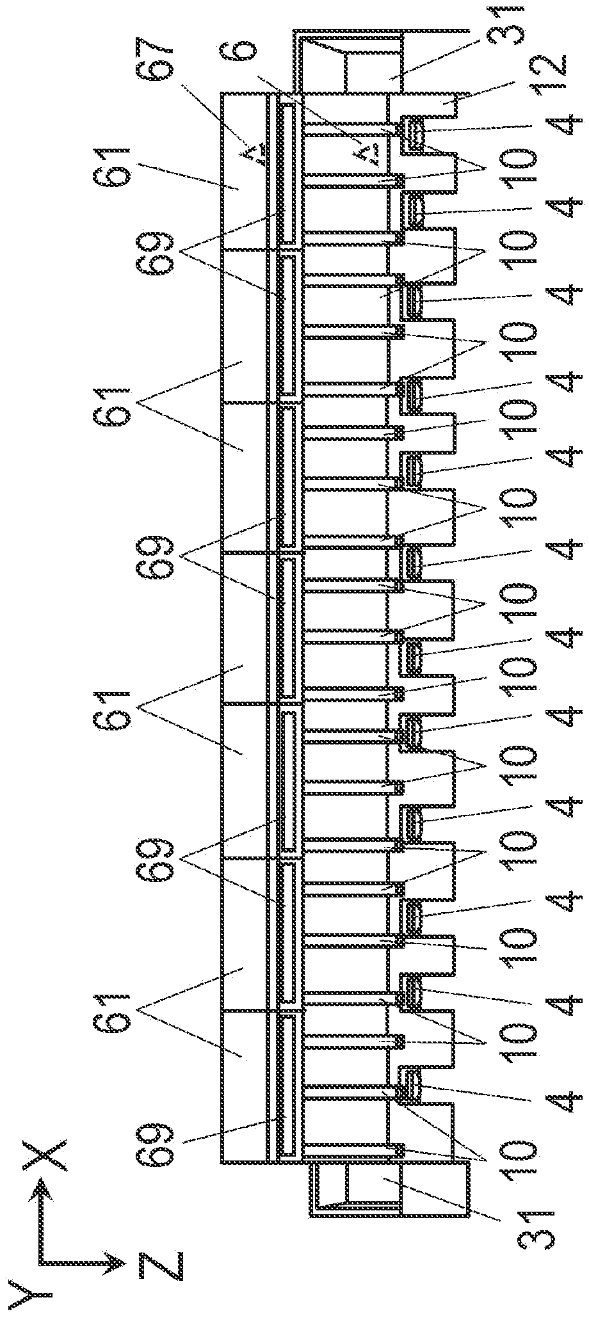
FIG. 8 is an explanatory diagram of the supply device according to the First Embodiment.

FIG. 8 is a front view of the supply device 200 viewed from the Y-axis direction. FIG. 8 illustrates the supply device 200 in a state where the roll sheet R or the spool member 2 is not set. The supply device 200 in the First Embodiment includes a plurality of the supply guides 69 and the conveyance guides 61. The plurality of supply guides 69 and conveyance guides 61 provided on the upper side with respect to the arm member 4 and the separation flapper 10 are disposed so as to be aligned laterally in the width direction (X-axis direction). The supply guides 69 and the conveyance guides 61 are disposed so as to cover the entire length in the width direction of the roll sheet R which can be set in the print device 100. As a result, regardless of the length in the width direction of the roll sheet R, the roll sheet R can be led to the supply guide 69 while pressing the vicinities of both end parts in the width direction with the hand, and the user can supply the sheet 1 with favorable workability.

In the width direction (X-axis direction) of the supply device 200, the first sheet-detection sensor 6 and the second sheet-detection sensor 67 are provided on one end part on the reference side of the conveyance guide 61. Since the first sheet-detection sensor 6 and the second sheet-detection sensor 67 are provided on the reference side to be a reference of positioning in the width direction of the roll sheet R, even if the roll sheet R with a small width is set, presence/absence of the sheet 1 can be reliably detected.

In the lower part in the vertical direction of the supply guide 69, a plurality of the separation flappers 10 are provided. The separation flappers 10 are disposed in plural in the width direction of the supply device 200. The separation flappers 10 are provided at positions corresponding to the end parts in the width direction of the roll sheets R with major sizes. As a result, an end-part curl of the roll sheet R can be guided and the sheet 1 can be delivered to the conveyance guide 12 correspondingly to the roll sheets R with various sizes. Moreover, the arm members 4 are also disposed in plural in the width direction of the roll sheet R. The arm member 4 is disposed so as to avoid interference with the non-reference flange 24 when the roll sheet R with the major size is set.

It is to be noted that, in the First Embodiment, a resin is employed for materials of the supply guide 69 and the conveyance guide 61, and they are divided and disposed so that they can be formed with a size corresponding to an injection molding machine. However, in application of the present invention, the aforementioned configuration is not limiting, but the supply guide 69 or the conveyance guide 61 may be a single component penetrating in the width direction, and extrusion or sheet metal of aluminum as a material may be used.

Control Configuration

Figure 9:
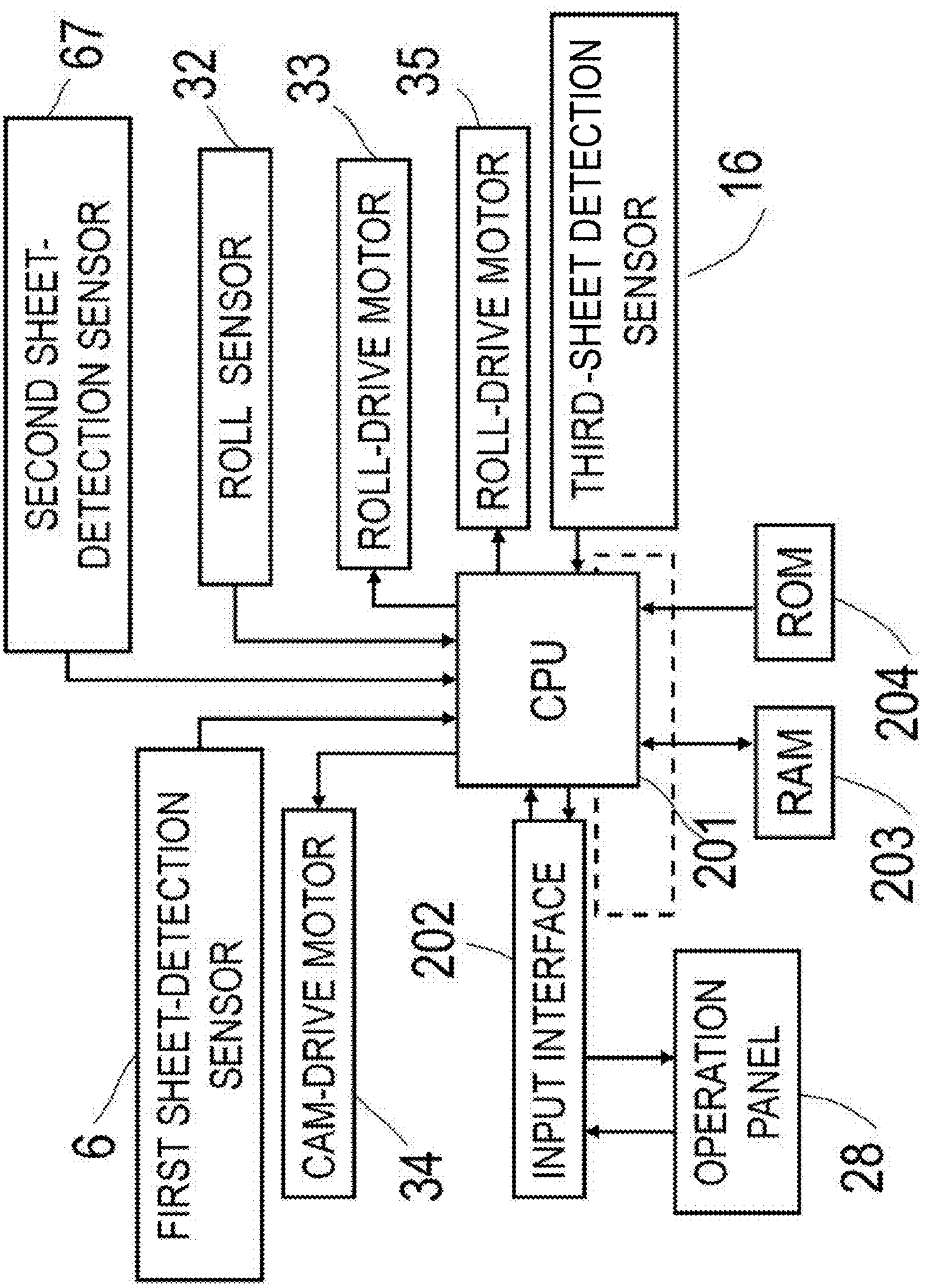
FIG. 9 is a block diagram of a control configuration of the print device according to the First Embodiment.

Subsequently, a control configuration of the print device 100 will be explained, FIG. 9 is a block diagram illustrating a configuration example of a control system in the print device 100. A control portion of the print device 100 includes a CPU 201, a RAM 203, and a ROM 204. The CPU 201 controls each part of the print device 100 including the supply device 200, the conveying portion 300, and the print portion 400 in accordance with a control program stored in the ROM 204. To the CPU 201, a type, a width, and various types of setting information and the like of the sheet 1 and the like are input from an operation panel 28 via an input interface 202. Moreover, the CPU 201 writes and reads information related to the sheet 1 with respect to the RAM 203.

The CPU 201 drives the roll-drive motor 33 which rotates the roll sheet R forward and backward, a cam-drive motor 34 which rotates the rotation cam 3*a* pressing the arm member 4, and the roller-drive motor 35 which rotates the conveyance roller 14 forward and backward, for example. Moreover, the CPU 201 drives a rotation mechanism or the like of each part of the print device 100 on the basis of the information detected by the various sensors. The various sensors include the roll sensor 32 of the supply device 200, the first sheet-detection sensor 6 of the first sheet-supply portion 50, the second sheet-detection sensor 67 of the second sheet-supply portion 60, and the third sheet-detection sensor 16 of the conveying portion 300.

Sheet Supply Method

Figure 10:
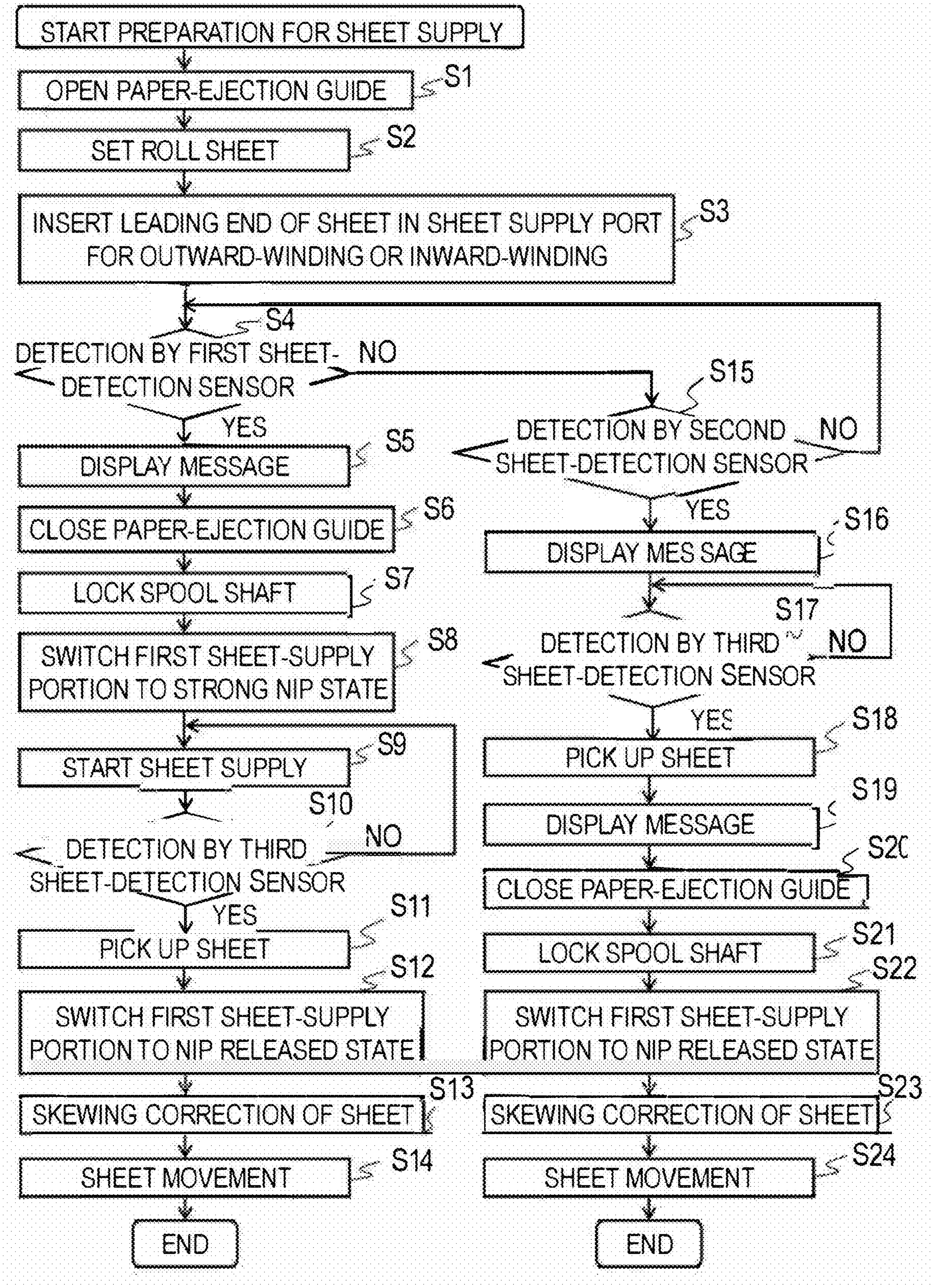
FIG. 10 is a flowchart of a sheet supply method according to the First Embodiment.

Subsequently, on the basis of a flowchart, a supply method of the sheet 1 in the supply device 200 will be explained in more detail. FIG. 10 is a flowchart illustrating a supply procedure of the sheet 1. Steps S1 to St4 are steps for supplying the sheet 1 from the outward-wound roll sheet R1, and Steps S1 to S4 and Steps S15 to S24 are steps for supplying the sheet 1 from the inward-wound roll sheet R2.

First, a case in which the outward-wound roll sheet R1 is set in the supply device 200, and the sheet 1 is supplied will be explained as an example. In order to set the outward-wound roll sheet R1 in the supply device 200, the user opens the paper-ejection guide 91, which is a dust/roll cover of the roll sheet R (Step S1). At this time, the first sheet-supply portion 50 for the outward-winding is in the weak nip state, and the arm member 4 stands by in a state pressed by the "pressing force of the weak nip" in the arrow A1 direction. And the outward-wound roll sheet R1 on which the spool member 2 is mounted is set in the supply device 200 (Step S2). The fact that the outward-wound roll sheet R1 was set is detected by the roll sensor 32.

After the outward-wound roll sheet R1 is set, the user manually rotates the outward-wound roll sheet R1 in the arrow C1 direction and inserts the leading end of the sheet 1 into the sheet supply port between the arm member 4 and the separation flapper 10 (Step S3). When the roll sheet R is rotated manually, operability is good when the reference flange 23 or the non-reference flange 24 is rotated. Moreover, when the sheet 1 is inserted into the sheet supply port of the first sheet-supply portion 50, it is preferable that the outward-wound roll sheet R1 is rotated in the arrow C1 direction after the sagging of the sheet 1 is removed by rotating the outward-wound roll sheet R1 in the arrow C2 direction.

After the sheet 1 pulled out of the outward-wound roll sheet R1 is inserted into the sheet supply port of the first sheet-supply portion 50 and is supplied to the first supply path 50*a*, the sheet 1 is detected by the first sheet-detection sensor 6 (Step S4). When the sheet 1 is inserted to a position detected by the first sheet-detection sensor 6 (YES at Step S4), the CPU 201 of the print device 100 causes a message "Close the paper-ejection guide" to be displayed on the display portion of the operation panel 28 (Step S5).

When the user closes the paper-ejection guide 91 in response to the message displayed on the operation panel 28 (Step S6), the CPU 201 locks the spool shaft 21 by a locking mechanism (Step S7) so that the spool shaft 21 does not rise from the spool holder 31. When the spool shaft 21 holding the outward-wound roll sheet R1 is locked by the supply device 200, the CPU 201 switches the first sheet-supply portion 50 from the weak nip state to the strong nip state (Step S8). That is, the arm member 4 is pressed by the torsion coil spring 3*c* with a stronger force in the arrow A1 direction, and the outward-wound roll sheet R1 is brought into pressure contact with the driven rotating members 8, 9 with a stronger force.

After that, the CPU 201 rotates the outward-wound roll sheet R1 in the arrow C1 direction by the roll-drive motor 33 and starts supply of the sheet 1 (Step S9). After the supply of the sheet 1 is started, the sheet 1 is detected by the third sheet-detection sensor 16 of the conveying portion 300 (Step S10). While the sheet 1 is not detected by the third sheet-detection sensor 16 (No at Step S10), the outward-wound roll sheet R1 continues to rotate. When the leading end of the sheet 1 is detected by the third sheet-detection sensor 16 (YES at Step S10), the CPU 201 rotates the conveyance roller 14 forward in the arrow D1 direction. Then, the leading end of the sheet 1 is held by the conveyance roller 14 and the nip roller 15 and is picked up (Step S11). When the pick-up of the sheet 1 is completed, the CPU 201 switches the first sheet-supply portion 50 to the nip released state (Step S12). At this time, the pressing force for pressing the arm member 4 in the arrow A1 direction is released, and the driven rotating members 8, 9 are separated from the outward-wound roll sheet R1.

Subsequently, skewing of the sheet 1 is corrected (Step S13). In the skewing correction of the sheet 1, first, the CPU 201 detects the skewing of the sheet 1 conveyed in the conveying portion 300. Specifically, a predetermined amount of the sheet 1 is conveyed in the conveying portion 300, and a skewing amount generated at that time is detected by a sensor or the like provided in the conveying portion 300. If the skewing amount is larger than a predetermined allowable amount, while back tension is given to the sheet 1, feeding and back-feeding of the sheet 1 is repeated with forward rotation and backward rotation of the conveyance roller 14 and the outward-wound roll sheet R1. By means of the operation as above, the skewing of the sheet t is corrected. In this way, in the skewing correction of the sheet 1 and in the print operation of an image onto the sheet 1, the first sheet-supply portion 50 is brought into the nip released state. As a result, a bad influence given by the driven rotating members 8, 9 to correction accuracy of the skewing of the sheet 1 and print accuracy of an image can be avoided.

After that, the CPU 201 causes the leading end of the sheet 1 to move by the conveying portion 300 to a standby position (fixed position) before print start in the print portion 400 (Step S14). As a result, preparation for the supply of the sheet 1 to the print portion 400 is completed. After that, the sheet 1 is pulled out of the outward-wound roll sheet R1 with the rotation of the outward-wound roll sheet R1 and is conveyed by the conveying portion 300 to the print portion 400.

Subsequently, a case in which the inward-wound roll sheet R2 is set in the supply device 200, and the sheet 1 is supplied will be explained as an example. Steps S1, S2 are executed similarly for the case in which the outward-wound roll sheet R1 is set and the case where the inward-wound roll sheet R2 is set. That is, the user opens the paper-ejection guide 91 (Step S1) and sets the inward-wound roll sheet R2 on which the spool member 2 is mounted (Step S2).

The user sets the inward-wound roll sheet R2 and then, picks the unwound leading end of the inward-wound roll sheet R2 and pulls it out onto the supply guide 69. Then, the user pushes the pulled-out sheet 1 from on the supply guide 69 toward the conveyance guide 61 and inserts the sheet 1 into the sheet supply port between the upper guide portion 61*a* and the lower guide portion 61*b* (Step S3).

After the sheet 1 pulled out of the inward-wound roll sheet R2 is inserted into the sheet supply port of the second sheet-supply portion 60 and is supplied to the second supply path 60*a*, the sheet 1 is not detected by the first sheet-detection sensor 6 (NO at Step S4). Then, the sheet 1 inserted into the sheet supply port of the second sheet-supply portion 60 is detected by the second sheet-detection sensor 67 (Step S15). While the sheet 1 is not detected by the second sheet-detection sensor 67 (NO at Step S15), the user needs to continue to feed the sheet 1 into the second sheet-supply portion 60. When the leading end of the sheet 1 is detected by the second sheet-detection sensor 67 (YES at Step S15), the CPU 201 causes a message “Feed in the sheet” to be displayed on the display portion of the operation panel 28 (Step S16).

After the user pushes in the sheet 1 in response to the message displayed on the operation panel 28, the sheet 1 is detected by the third sheet-detection sensor 16 of the conveying portion 300 (Step S17). While the sheet 1 is not detected by the third sheet-detection sensor 16 (NO at Step S17), the user continues to pull the sheet 1 out of the inward-wound roll sheet R2 and to push it in. When the leading end of the sheet 1 is detected by the third sheet-detection sensor 16 (YES at Step S17), the CPU 201 rotates the conveyance roller 14 forward in the arrow D1 direction and picks up the leading end of the sheet 1 (Step S18). When the pick-up of the sheet 1 is completed, the CPU 201 causes the message “Close the sheet-ejection guide” to be displayed on the display portion of the operation panel 28 (Step S19).

When the user closes the paper-ejection guide 91 in response to the message displayed on the operation panel 28 (Step S20), the CPU 201 locks the spool shaft 21 by the locking mechanism (Step S21) so that the spool shaft 21 does not rise from the spool holder 31. When the spool shaft 21 holding the inward-wound roll sheet R2 is locked by the supply device 200, the CPU 201 switches the first sheet-supply portion 50 to the nip released state (Step S22). At this time, the pressing force for pressing the arm member 4 in the arrow A1 direction is released, and the driven rotating members 8, 9 are separated from the inward-wound roll sheet R2.

After that, similarly to Step S13, the skewing correction of the sheet 1 is performed (Step S23). That is, in the skewing correction of the sheet 1 and in the print operation of an image onto the sheet 1, the first sheet-supply portion 50 for outward-winding is brought into the nip released state. As a result, a bad influence given by the driven rotating members 8, 9 to the correction accuracy of the skewing of the sheet 1 and the print accuracy of an image can be avoided. It is to be noted that, when the inward-wound roll sheet R2 is set, the rotating direction of the roll-drive motor 33 by the CPU 201 is controlled to be a direction opposite to the rotating direction of the roll-drive motor 33 when the outward-wound roll sheet R1 is set.

After that, the CPU 201 moves the leading end of the sheet 1 to the standby position (fixed position) before print start in the print portion 400 by the conveying portion 300 (Step S24). As a result, the preparation for the supply of the sheet 1 to the print portion 400 is completed. After that, the sheet 1 is pulled out of the inward-wound roll sheet R2 with the rotation of the inward-wound roll sheet R2 and is conveyed by the conveying portion 300 to the print portion 400.

It is to be noted that, in application of the present invention, the sheet supply method does not necessarily have to include all the aforementioned steps, but execution orders or execution contents of various steps can be changed. For example, in the First Embodiment, the paper-ejection guide 91 is configured to be manually opened/closed by the user, but a mechanism for automatically opening/closing the paper-ejection guide 91 may be provided in the print device 100. Moreover, in the aforementioned configuration, after the outward-wound roll sheet RA is set, the user rotates the outward-wound roll sheet R1, but it may be rotated by the roll-drive motor 33, and the sheet 1 is supplied separately. Furthermore, for example, such a configuration that, when the sheet 1 is manually supplied to the supply path, the skewing of the sheet 1 is detected and notified to the user may be provided in the print device 100.

As described above, according to the configuration of the First Embodiment, since the supply device 200 includes the first supply path 50*a* and the second supply path 60*a*, the sheet 1 can be pulled out of the roll sheet R and supplied, regardless of the winding direction of the roll sheet R (facing direction of the print surface P). Specifically, when the outward-wound roll sheet R1 is set in the supply device 200, the sheet 1 can be supplied through the first supply path 50*a*, while when the inward-wound roll sheet R2 is set, the sheet 1 can be supplied through the second supply path 60*a*. That is, according to the configuration of the First Embodiment, the supply device 200 can be configured such that the outward-wound roll sheet R1 and the inward-wound roll sheet R2 can be selectively supported by the same support portion, and the sheet 1 can be supplied without providing a mechanism or conveyance path for reversing the surface of the sheet 1. As a result, a size increase or cost rise of the supply device 200 can be suppressed.

Second Embodiment

Subsequently, a Second Embodiment according to the present invention will be explained. The supply device 200 of the Second Embodiment is different from the First Embodiment in a control method of the first sheet-supply portion 50 when the sheet 1 pulled out of the outward-wound roll sheet R1 is supplied. Hereinafter, in the explanation of the Second Embodiment, the same signs are given to the configurations similar to those in the First Embodiment, for which explanation will be omitted, and only featured configurations of the Second Embodiment will be explained.

In the First Embodiment, in the skewing correction of the sheet 1 and in the print operation of the image onto the sheet 1, the first sheet-supply portion 50 for the outward-winding was in the nip released state. In the Second Embodiment, even in a case where the sheet 1 cannot be supplied automatically, the first sheet-supply portion 50 is in the nip released state. In a case where the sheet 1 is of a paper type with high stiffness, strong curling, and large conveyance resistance, for example, it is difficult to automatically supply the sheet 1 as in the First Embodiment. Thus, the Second Embodiment is configured such that, even when the outward-wound roll sheet R1 is set in the supply device 200, the sheet 1 can be supplied when the first sheet-supply portion 50 is in the nip released state.

Figure 11:
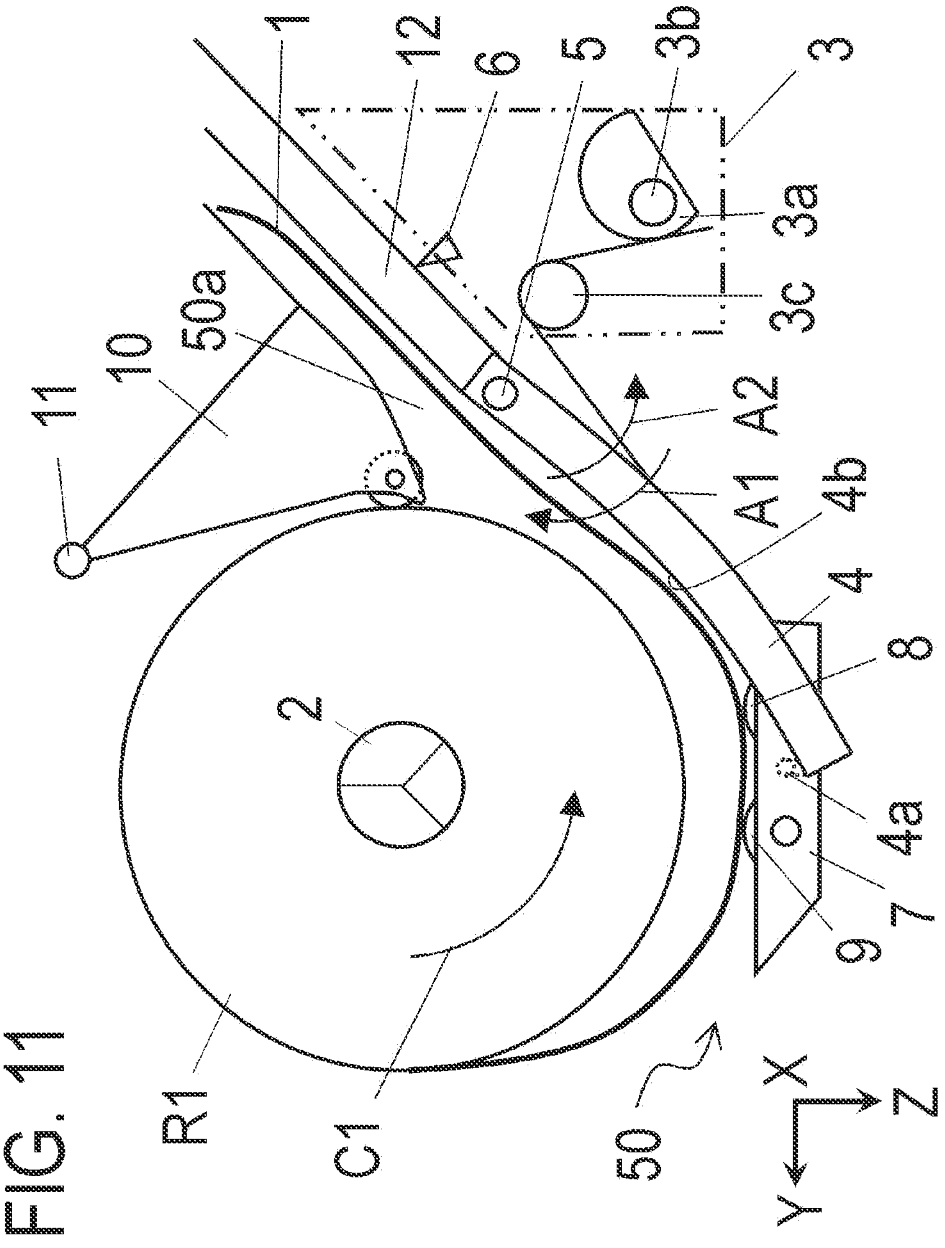
FIG. 11 is an explanatory diagram illustrating a state of sheet supply according to a Second Embodiment.

FIG. 11 is an explanatory diagram illustrating a state in which the sheet 1 is supplied from the outward-wound roll sheet R1 in the first sheet-supply portion 50 in the nip released state. As shown in FIG. 11, when the first sheet-supply portion 50 is in the nip released state, the driven rotating members 8, 9 moving together with the arm member 4 are separated from the outward-wound roll sheet R1. In the Second Embodiment, with the first sheet-supply portion 50 in the nip released state, the leading end of the sheet 1 is inserted manually into the first supply path 50*a* on the arm member 4, and the leading end of the sheet 1 can be supplied to a position of the conveyance roller 14. That is, the user puts the hand in the supply device 200 such as a gap between the arm member 4 and the outward-wound roll sheet R1 and rotates the outward-wound roll sheet R1 in the arrow C1 direction so as to feed the leading end of the sheet 1 to the position of the conveyance roller 14. And the sheet 1 is picked up by the conveyance roller 14, and the preparation for the supply of the sheet 1 to the print portion 400 is completed. By means of the configuration as above, even the sheet 1 with high stiffness and strong curling can be also supplied.

It is to be noted that, in the Second Embodiment, when the third sheet-detection sensor 16 does not detect the sheet 1 even if the roll sheet R is rotated for a predetermined amount, the CPU 201 may prompt the user to manually insert the sheet 1 by assuming that the first sheet-supply portion 50 is in the nip released state. Alternatively, it may be so configured that the control portion determines which of manually and automatically the sheet 1 should be inserted depending on the selected sheet type.

As described above, according to the Second Embodiment, since the sheet 1 can be supplied even when the first sheet-supply portion 50 is in the nip released state, the number of types of the roll sheets R which can be set in the supply device 200 is drastically increased, and more types of the sheets 1 can be handled.

Third Embodiment

Subsequently, a. Third Embodiment according to the present invention will be explained. The supply device 200 in the Third Embodiment is different from the First Embodiment in a method of adjusting the pressing force with which the drive portion 3 presses the arm member 4. Hereinafter, in the explanation of the Third Embodiment, the same signs are given to the configurations similar to those in the First Embodiment, for which explanation will be omitted, and only featured configurations of the Third Embodiment will be explained.

In the First Embodiment, the pressing force with which the torsion coil spring 3*c* of the drive portion 3 presses the arm member 4 can be switched between “pressing force of strong nip” and the “pressing force of weak nip”, and the first sheet-supply portion 50 is configured capable of switching to the strong nip state, the weak nip state, and the released state. On the other hand, in the Third Embodiment, the supply device 200 is configured such that the pressing force with which the torsion coil spring 3*c* of the drive portion 3 presses the arm member 4 can be adjusted more finely.

The drive portion 3 in the Third Embodiment is configured such that, with the rotation of the rotation cam 3*a*, the attitude of the torsion coil spring 3*c* is gradually changed, and the pressing force with which the torsion coil spring 3*c* presses the arm member 4 is gradually changed. The pressing force corresponding to a rotation phase of the rotation cam 3*a* is stored in the ROM 204 of the control portion, and the CPU 201 drives the cam-drive motor 34 so that the rotation cam 3*a* is rotated in accordance with the desired pressing force. Moreover, the ROM 204 of the control portion stores the pressing force corresponding to the sheet type to be used, and the attitude of the rotation cam 3*a* is set as appropriate so that a contact state between the roll sheet R and the driven rotating members 8, 9 becomes appropriate in accordance with the type of the roll sheet R to be used.

In the Third Embodiment, in a case where the sheet 1 such as paper with high stiffness such as art paper with a strong surface layer and for which the pressing force at supply can be reinforced, paper with a high basis weight represented by canvas and the like is to be used, for example, the pressing force in the strong nip state is set strong. As a result, the con eying force for the sheet 1 is made stronger, and the sheet 1 can be supplied to the print portion 400 more reliably. That is, by setting the pressing force in the strong nip state stronger for the sheet 1 which is difficult to be supplied, automatic supply of more types of sheets 1 is enabled. Moreover, in the Third Embodiment, too, when the sheet 1 for which the automatic supply is extremely difficult is to be used, it may be so configured that the sheet 1 can be supplied manually as in the Second Embodiment. Furthermore, the aforementioned pressing-force adjustment mechanism can be applied not only to the supply device 200 but also to the winding device 600.

As described above, according to the Third Embodiment, the nip state of the roll sheet R in the first sheet-supply portion 50 can be switched in accordance with the sheet type. By means of the configuration as above, the pressing force in the strong nip state can be set optimally in accordance with conveyance resistance determined by a shape of the supply path or conveyance path of the sheet 1, stiffness of the sheet 1, and a friction coefficient. Furthermore, when the roll sheet R is to be set, the first sheet-supply portion 50 is in the weak nip state. Thus, when the roll sheet R is set, the pressing force in the weak nip state can be set as appropriate in accordance with a size or a weight of the roll sheet R so that the spool shaft 21 of the spool member 2 does not rise from the spool holder 31 by being pressed by the driven rotating members 8, 9. According to the configuration as above, even in a state where only a paper tube of the roll sheet R is mounted on the spool shaft 21, the spool shaft 21 can be mounted on the spool holder 31 and locked more reliably.

Fourth Embodiment

Subsequently, a Fourth Embodiment according to the present invention will be explained. The supply device 200 of the Fourth Embodiment is different from the First Embodiment in a point that the separation flapper 10 is configured movably to a retreat position. Hereinafter, in the explanation of the Fourth Embodiment, the same signs are given to the configurations similar to those in the First Embodiment, for which explanation will be omitted, and only featured configurations of the Fourth Embodiment will be explained.

In the First Embodiment, it is configured such that the separation flapper 10 is rotationally moved by its own weight so as to press the roll sheet R set in the supply device 200. However, when the sheet 1 in which a scratch or a dent can be easily generated is to be used, since there is a concern that the sheet 1 is damaged by the separation flapper 10, which causes deterioration in an image quality, it is not necessarily preferable that the separation flapper 10 is brought into contact with the roll sheet R. Thus, in the Fourth Embodiment, the separation flapper 10 is configured capable of being brought into contact with/separated from the roll sheet R.

Figure 12:
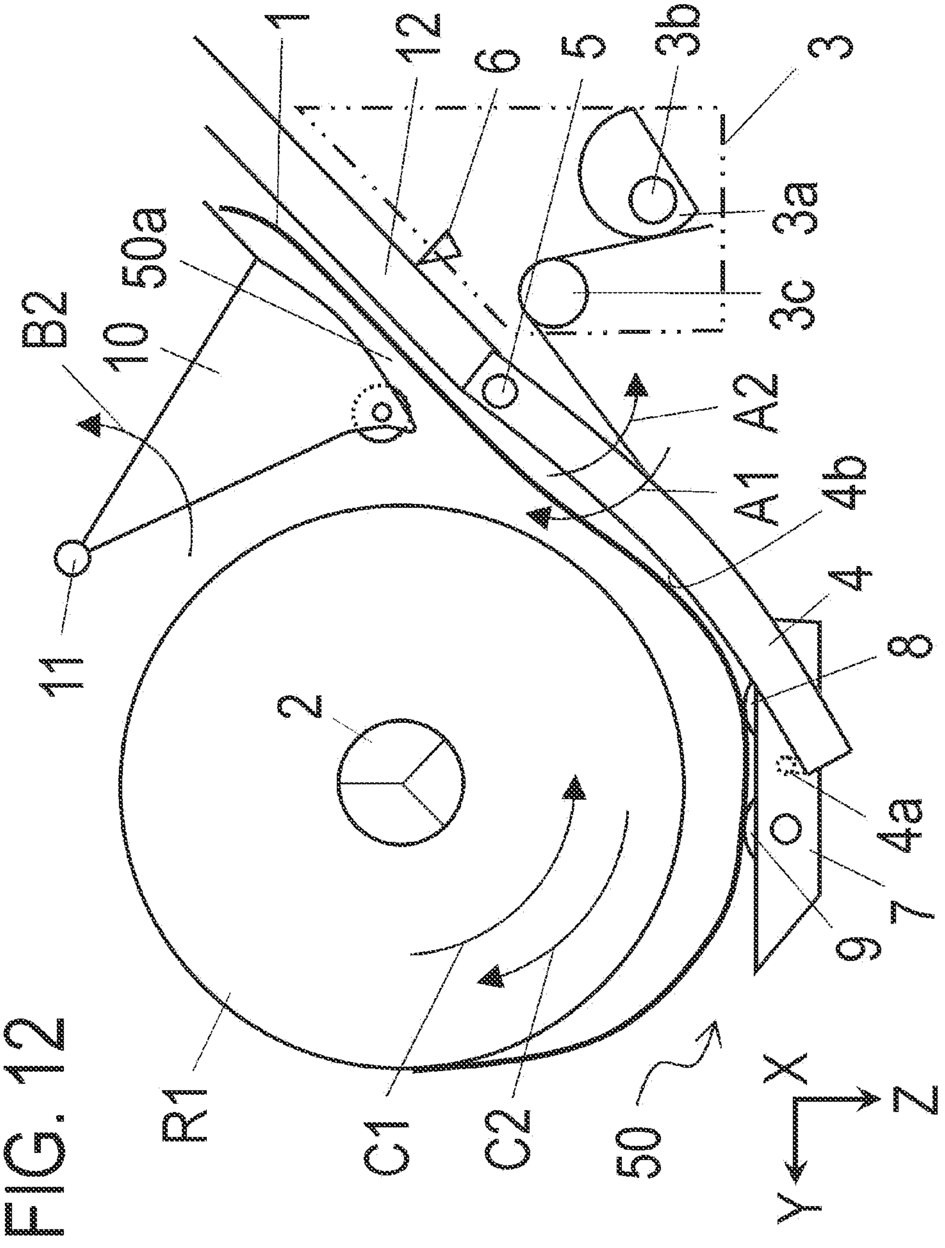
FIG. 12 is an explanatory diagram of a supply device according to a Fourth Embodiment.

FIG. 12 is an explanatory diagram of the first sheet-supply portion 50 of the supply device 200 according to the Fourth Embodiment. In the Fourth Embodiment, the separation flapper 10 is rotationally moved by a rotational movement mechanism in the arrow B2 direction around the rotation shaft. It and is separated from the roll sheet R. According to the configuration as above, when the sheet 1 susceptible to damage is to be used, by separating the separation flapper 10, damage on the sheet 1 and deterioration of the image quality can be prevented.

Similarly to the First Embodiment, in the Fourth Embodiment, too, the separation flappers 10 are disposed in plural in the width direction (X-axis direction) of the supply device 200. The separation flappers 10 are provided in plural in order to improve a separation function for separating the leading end of the sheet 1 from the roll sheet R and to suppress sagging of the sheet 1 when passing through the supply path in the entire region in the width direction of the roll sheet R, whereby the sheet 1 is stably supplied.

Figure 13:
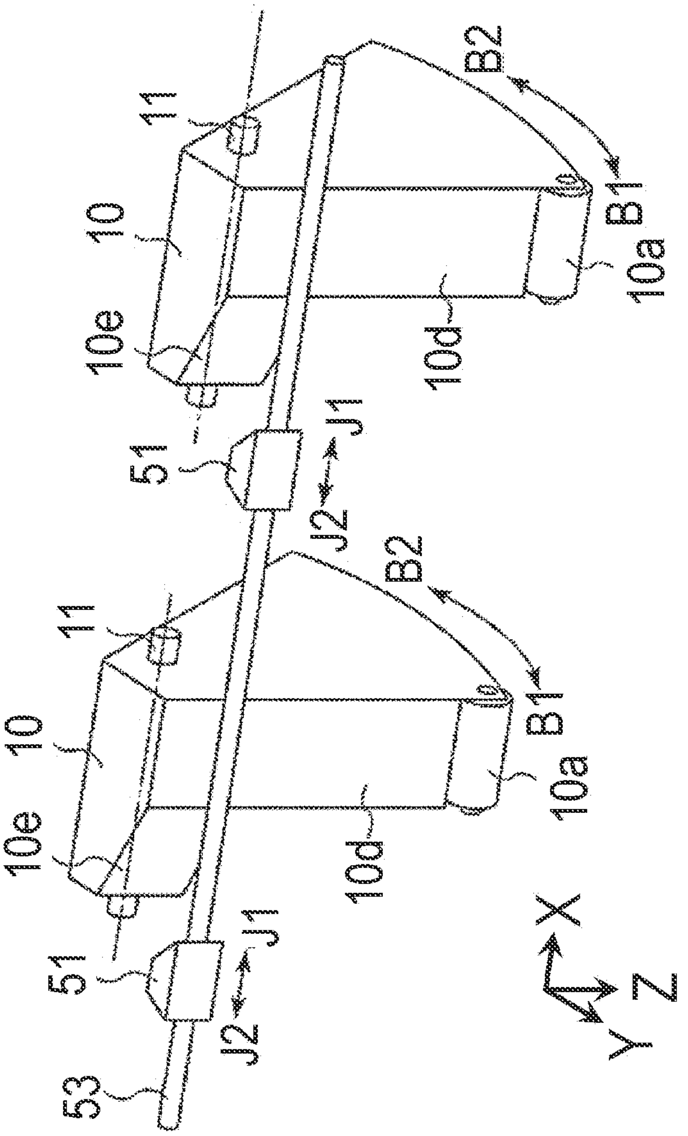
FIG. 13 is a perspective view of a separation flapper according to the Fourth Embodiment.

FIG. 13 is a perspective view of the rotational movement mechanism of the separation flapper 10 according to the Fourth Embodiment. The separation flapper 10 has a cam surface 10*e* formed on an arm portion 10*d* connected to the rotation shaft 1I and holding the driven roller 10*a*. The cam surface 10*e* is a surface inclined with respect to the front-back direction (Y-axis direction) and the width direction (X-axis direction) and in parallel to the vertical direction (Z-axis direction). And in the supply device 200, cams 51 are provided correspondingly to each of the plurality of separation flappers 10. The plurality of cams 51 are fixed to a shaft 53 extending in the width direction. And by movement of the shaft 53 in the width direction, all the cams 51 are moved integrally in the width direction. That is, the cams 51 are configured slidably in arrow J1, J2 directions along the width direction.

In the state separated from the corresponding separation flapper 10, the cam 51 is located on the arrow J2 direction side with respect to the separation flapper 10. Moreover, the cam surface 10*e* of the separation flapper 10 is inclined so as to go toward a front direction of the print device 100 as it goes toward the arrow JP direction. And the rotational movement mechanism of the separation flapper 10 is configured such that, when the cam 51 slides in the arrow J1 direction with the movement of the shaft 53, the cam surface of the cam 51 is brought into contact with the cam surface 10*e* of the separation flapper 10, and the separation flapper 10 is rotationally moved in the arrow B2 direction against its own weight. Since the state in which the cam 51 is in contact with the arm portion 10*d* of the separation flapper 10 is maintained, the state in which the separation flapper 10 is separated from the roll sheet R is maintained. Moreover, when the cam 51 moves in the arrow J2 direction and is separated from the separation flapper 10 from the state in contact with the separation flapper 10, the separation flapper 10 is rotationally moved in the arrow B1 direction by its own weight.

In the Fourth Embodiment, a lever portion, not shown, which is connected to the shaft 53 and moves the shaft 53 and the cam 51 in the width direction is provided in the print device 100. By operating the lever portion, the user can switch between the contact state and the separated state of the separation flapper 10 with respect to the roll sheet R. Therefore, when the sheet 1 susceptible to damage is to be used, the user can prevent damage to the sheet 1 by the separation flapper 10 by moving the cam 51 in the arrow J1 direction so as to separate the separation flapper 10 from the roll sheet R. Moreover, when the sheet 1 hardly susceptible to damage is to be used, the user can improve the separation function of the sheet 1 by moving the cam 51 in the arrow J2 direction so as to bring the separation flapper 10 into contact with the roll sheet R.

It is to be noted that, in the aforementioned configuration, all the cams 51 are integrally moved, and all the separation flappers 10 are rotationally moved in conjunction at the same time. However, the supply device 200 may be configured such that the respective cams 51 are independently movable, and the respective separation flappers 10 are rotationally and independently movable. That is, the separation flappers 10 disposed in plural in the width direction of the roll sheet R may be configured to be independently movable to a contact position in contact with the roll sheet R and the retreat position retreating from the roll sheet R, respectively.

Moreover, in the aforementioned configuration, the user causes the separation flapper 10 to be separated from the roll sheet R by the manual operation of the lever portion as necessary. However, the supply device 200 may be configured to automatically separate the separation flapper 10 from the roll sheet R by using a motor or the like on the basis of a selection result of a type of the sheet 1 to be used. Moreover, the cam 51 is not limited to a slider cam sliding linearly as in this example but may be a rotating can, for example. When the rotating cam is used in the rotational movement mechanism, too, the cam may be manually rotatable or may be automatically rotatable.

Alternatively, if the outward-wound roll sheet R1 is rotated in the arrow C1 direction erroneously, while the driven roller 10*a* is in contact with the outward-wound roll sheet R1 in a state where the leading end of the sheet 1 has not been peeled off the outward-wound roll sheet R1, the sheet 1 is forcedly peeled off. As described above, when the sheet 1 is forcedly peeled off the roll sheet R, there is a concern that the sheet 1 is damaged. For example, the outward-wound roll sheet R1 in an unused state is stored in a state with one spot at a center in the width direction on the leading end of the sheet 1 bonded by a tape (or restricted by an unwinding prevention band or the like) with respect to the outer peripheral surface thereof. If the outward-wound roll sheet R1 in the stored state as above is set in the print device 100 and then, the outward-wound roll sheet R1 is erroneously rotated in the arrow C1 direction still in the stored state, there is a concern that the sheet 1 is ton. That is, the leading end of the sheet 1 is forcedly peeled off the outward-wound roll sheet R1 in a range not fixed or restricted (in the aforementioned case, both side parts away from the center in the width direction) and as a result, there is a concern that the sheet 1 is torn.

By considering the case as above, according to the Fourth Embodiment, the separation flapper 10 can be separated from the roll sheet R in advance, By causing the driven roller 10*a* of the separation flapper 10 to retreat from the outward-wound roll sheet R1 in advance, the damage on the sheet 1 can be avoided even if the roll sheet R still in the stored state is erroneously rotated. It is to be noted that, when the outward-wound roll sheet R1 still in the stored state is set in the print device 100, after the tape, a band or the like fixing the leading end of the sheet 1 is removed, the separation flapper 10 is rotationally moved so that the driven roller 10*a* is brought into contact with the outward-wound roll sheet R1. After that, by starting feeding of the sheet 1, the sheet 1 can be supplied safely.

Fifth Embodiment

Subsequently, a Fifth Embodiment according to the present invention will be explained. The supply device 200 of the Fifth Embodiment is different from the First Embodiment in a configuration of the second sheet-supply portion 60 for supplying the sheet 1 pulled out of the inward-wound roll sheet R2. Hereinafter, in the explanation of the Fifth Embodiment, the same signs are given to the configurations similar to those in the First Embodiment, for which explanation will be omitted, and only featured configurations of the Fifth Embodiment will be explained.

Figure 14A:
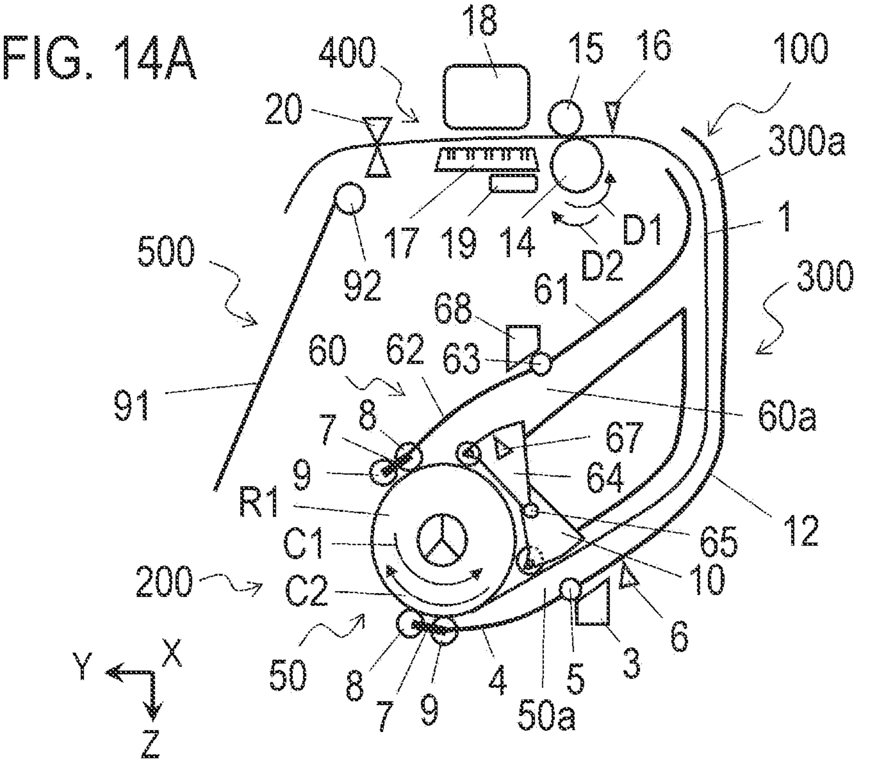
FIGS. 14A and 14B are explanatory diagrams of a conveyance path of a sheet according to a Fifth Embodiment.
Figure 14B:
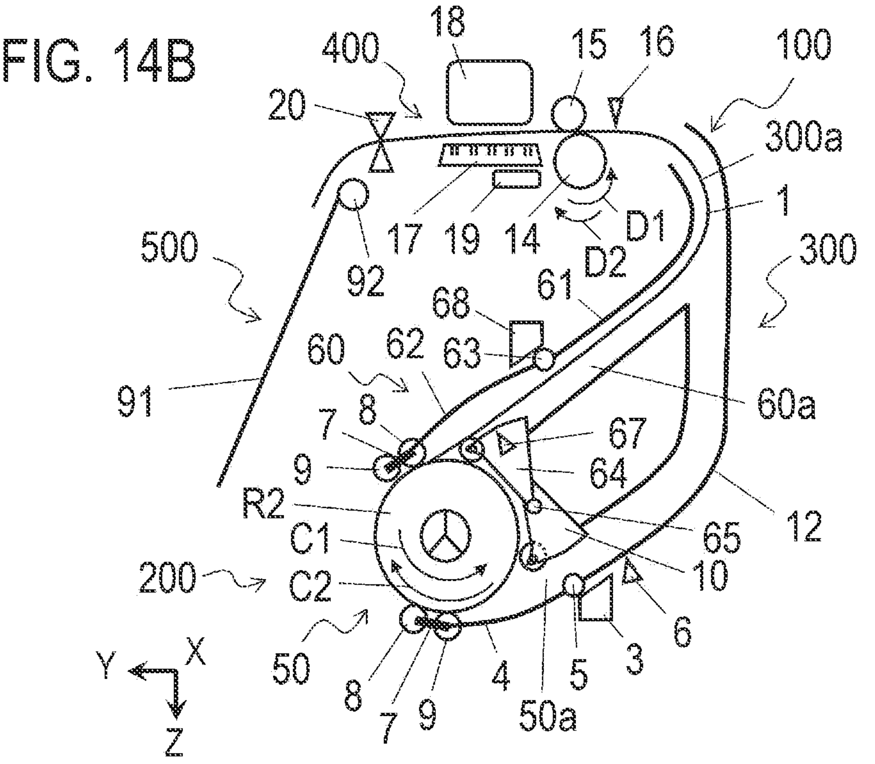

The supply device 200 of the Fifth Embodiment is configured such that the sheet 1 can be automatically pulled out of the inward-wound roll sheet R2 around which the sheet 1 is wound so that print surface P faces the inner side. FIGS. 14A and 14B are schematic sectional diagrams of an essential part of the print device 100 according to the Fifth Embodiment and illustrate a conveyance path of the sheet 1. FIG. 14A illustrates a state in which the sheet 1 pulled out of the outward-wound roll sheet R1 is supplied and conveyed. Moreover, FIG. 14B illustrates a state in which the sheet 1 pulled out of the inward-wound roll sheet R2 is supplied and conveyed.

As shown in FIG. 14A the sheet 1 pulled out of the outward-wound roll sheet R1 is supplied to the first supply path 50*a* of the first sheet-supply portion 50 and is conveyed to the print portion 400 through the conveying portion 300. The first supply path 50*a* is configured by the arm member 4 as a first arm member and the separation flapper 10 as a first separation flapper. On the other hand, as shown in FIG. 14B, the sheet 1 pulled out of the inward-wound roll sheet R2 is supplied to the second supply path 60*a* of the second sheet-supply portion 60 and is conveyed to the print portion 400 through the conveying portion 300. The second supply path 60*a* according to the Fifth Embodiment is configured by a second arm member 62 and a second separation flapper 64. First, a configuration of the second sheet-supply portion 60 according to the Fifth Embodiment will be explained.

Second Sheet-Supply Portion 60

Figure 15:
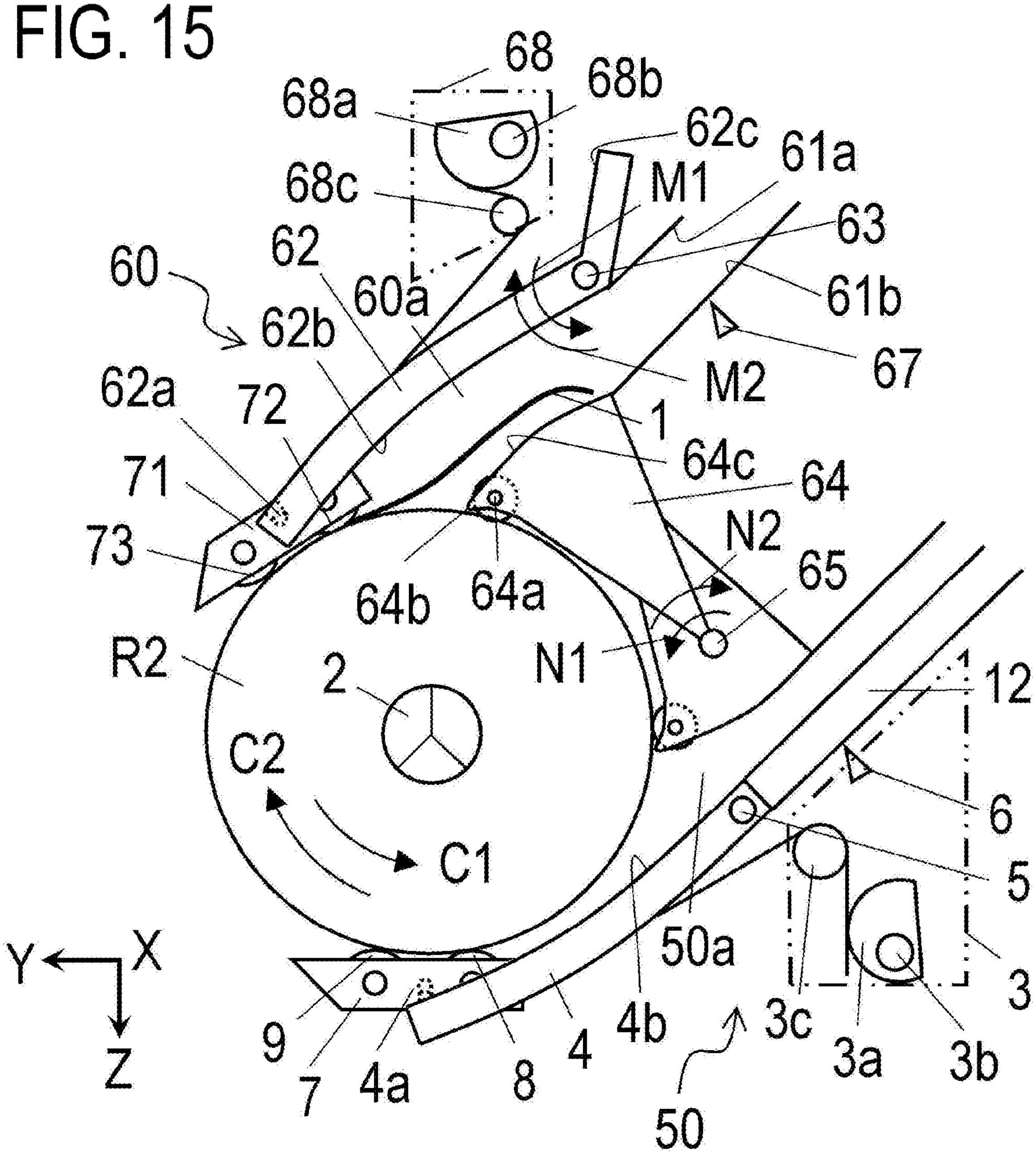
FIG. 15 is an explanatory diagram of a sheet supply portion according to the Fifth Embodiment.

The second sheet-supply portion 60 according to the Fifth Embodiment includes a second drive portion 68, the second arm member 62 rotationally moving around a rotation shaft 63, the second separation flapper 64 rotationally moving around a rotation shaft 65, and the second sheet-detection sensor 67. Moreover, the second sheet-supply portion 60 includes a swing member 71 and driven rotating members (contact bodies) 72, 73 similar to those of the first sheet-supply portion 50. FIG. 15 is an explanatory diagram of the second sheet-supply portion 60 of the supply device 200. The roll sheet R shown in FIG. 15 is the inward-wound roll sheet R2 and is in a state in which its outer diameter is relatively large.

Second Separation Flapper 64

On the conveyance guide 61, the second separation flapper 64 is mounted capable of rotational movement in arrow N1, N2 directions around the rotation shaft 65. The second separation flapper 64 has a driven roller 64*a*, a separating portion 64*b*, and a guide surface 64*c*. The second separation flapper 64 is provided in order to separate the leading end of the sheet from the inward-wound roll sheet R2. That is, in the supply device 200 of the Fifth Embodiment, the separation flapper 10 (first separation flapper) for the outward-wound roll sheet R1 and the second separation flapper 64 for the inward-wound roll sheet R2 are provided.

The rotation shaft 65 supports a lower end part of the second separation flapper 64, and the second separation flapper 64 is configured so as to lightly press the roll sheet R by its own weight. When the roll sheet R needs to be pressed more strongly, an urging member such as a spring which gives an urging force or the like may be provided.

The driven roller 64*a* is rotatably provided at a distal end part of the second separation flapper 64 and is brought into contact with the roll sheet R. Since the rotatable driven roller 64*a* is brought into contact with the roll sheet R, an influence of the pressing force of the roll sheet R by the second separation flapper 64 to the sheet 1 can be suppressed. Moreover, the separating portion 64*b* is provided in the vicinity of the driven roller 64*a* and on the distal end of the second separation flapper 64. The separating portion 64*b* is formed so that the separating portion 64*b* approaches the surface of the roll sheet R as much as possible, when the driven roller 64*a* is in contact with the roll sheet R. By means of the configuration as above, when the inward-wound roll sheet R2 is set, the leading end of the sheet 1 can be easily separated from the inward-wound roll sheet R2, The guide surface 64*c* is a surface facing upward of the second separation flapper 64 and guides the lower surface of the supplied sheet 1. That is, the second separation flapper 64 also functions as a guide member which it guides the sheet 1 at the supply of the sheet 1.

Moreover, the second separation flapper 64 is capable of switching to the separated state in which it rotationally moves in the N2 direction and moves to the retreat position, whereby the pressure contact state with the roll sheet R is released, and is separated from the roll sheet R. The rotational movement mechanism for rotationally moving the second separation flapper 64 to the retreat position can be configured similarly to the rotational movement mechanism of the separation flapper 10 explained as the Fourth Embodiment (see FIG. 13). That is, in the Fifth Embodiment, the first flapper movement mechanism for causing the separation flapper 10 to be brought into contact with/separated from the roll sheet R and the second flapper movement mechanism for causing the second separation flapper 64 to be brought into contact with/separated from the roll sheet R are provided.

It is to be noted that, the second separation flapper 64 may be configured to be separated in conjunction with the separation flapper 10 whose position is moved when the roll sheet R is removed. According to the configuration as above, in the setting procedure of the roll sheet R, which will be described later, the second separation flapper 64 can be switched to the separated state immediately before the setting of the roll sheet R and thus, a setting operation of the roll sheet R by the user is simplified.

A contact position between the second separation flapper 64 and the roll sheet R is located closer to the upper side in the vertical direction than a shaft center of the roll sheet R, and the conveyance guide 61 is located further closer to the upper side in the vertical direction than the second separation flapper 64.

In the Fifth Embodiment, the second separation flappers 64 are mounted in plural so as to be aligned in the width direction (X-axis direction) of the roll sheet R similarly to the separation flapper 10. The separation flapper 10 and the second separation flapper 64 are mounted alternately in the width direction so that the second separation flapper 64 and the separation flapper 10 do not overlap in the width direction.

Second Arm Member 62

Above the second separation flapper 64, at a position opposed to the second separation flapper 64, the second arm member 62 is mounted. The second arm member 62 is mounted capable of rotational movement in arrow M1, M2 directions by the rotation shaft 63. The second arm member 62 includes a shaft portion 62*a* engaged with the swing member 71, a guide portion 62*b* which guides the sheet 1 pulled out of the roll sheet R from above, and a follower portion 62*c* in contact with a rotation cam 68*a*. The guide portion 62*b* is formed in the lower part of the second arm member 62, and the second arm member 62 functions as a guide member at the supply of the sheet 1 from the inward-wound roll sheet R2. Moreover, the follower portion 62*c* is formed on a side opposite to the guide portion 62*b* with respect to the rotation shaft 63 and is opposed to the rotation cam 68*a*.

On the second arm member 62, similarly to the arm member 4 located below the roll sheet R, the swing member 71 is mounted capable of swing. Moreover, the driven rotating members 72, 73 are mounted rotatably also on the swing member 71 mounted on the second arm member 62. The swing member 71 is engaged with the shaft portion 62*a* of the second arm member 62 and is equalized so as to follow the outer peripheral part of the roll sheet R by an equalization mechanism similar to the swing member 7.

The second drive portion 68 has the rotation cam 68*a*, a rotary shaft 68*b* which rotatably supports the rotation cam 68*a*, and a torsion coil spring 68*c* which presses the second arm member 62 in accordance with the rotation of the rotation cam 68*a*. The torsion coil spring 68*c* is located between the second arm member 62 and the rotation cam 68*a* of the second drive portion 68 and presses the second arm member 62 in the arrow M1 direction. The second drive portion 68 functions as a second pressing mechanism which presses the second arm member 62. Moreover, the second drive portion 68 also functions as a second movement mechanism which moves the second arm member 62 so as to cause the driven rotating members 72, 73 to get closer to or to be separated from the outer peripheral part of the roll sheet R. The second drive portion 68 is configured similarly to the drive portion 3 which functions as a first pressing mechanism and a first movement mechanism and functions similarly.

Figure 16A:
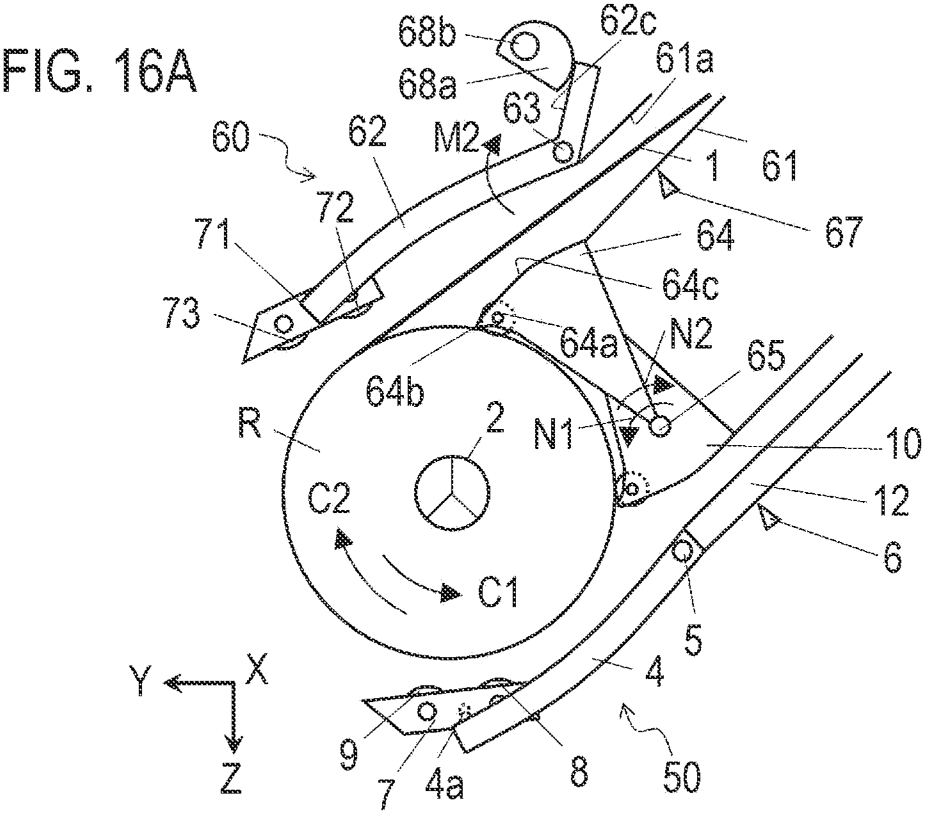
FIGS. 16A and 16B are explanatory diagrams of the sheet supply portion for inward-winding according to the Fifth Embodiment.
Figure 16B:
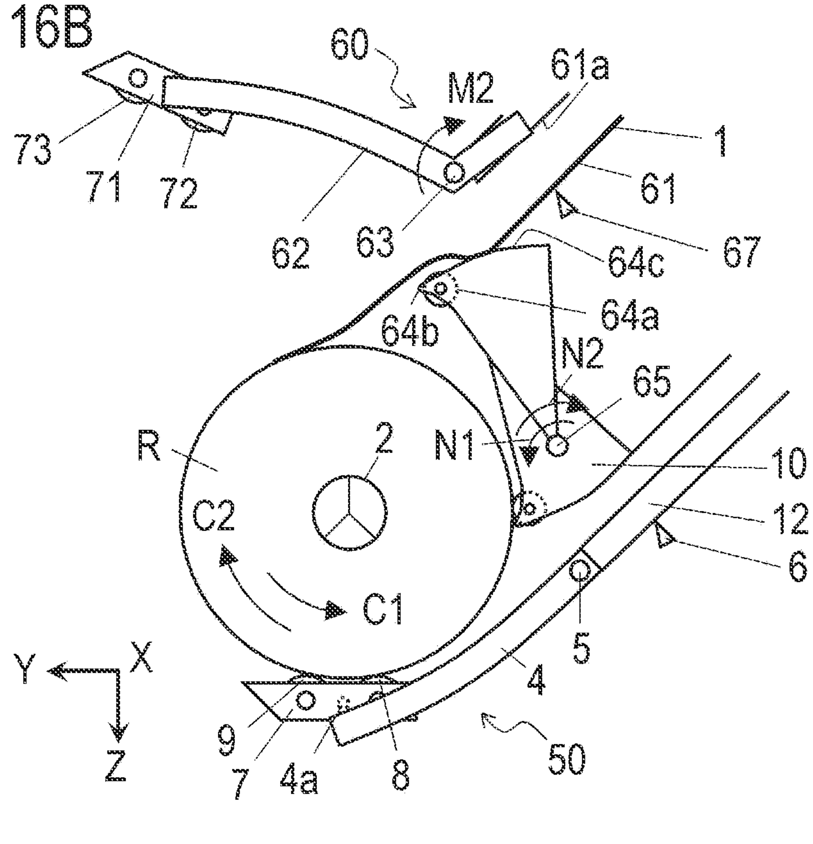

In the second sheet-supply portion 60, when the rotation cam 68*a* is rotated by a second cam-drive motor 66 (see FIG. 18), the force with which the torsion coil spring 68*c* presses the second arm member 62 in the arrow M1 direction is changed. In the Fifth Embodiment, the second sheet-supply portion 60 is configured capable of switching in four stages, that is, the strong nip state, the weak nip state, a first separated state, and a second separated state by changing the state of the second arm member 62. FIGS. 16A and 16B are explanatory diagrams illustrating states of the first sheet-supply portion 50 and the second sheet-supply portion 60 of the supply device 200 according to the Fifth Embodiment. FIG. 16A illustrates a state of the second sheet-supply portion 60 when the second sheet-supply portion 60 is in the first separated state, and FIG. 16B illustrates a state of the second sheet-supply portion 60 when the second sheet-supply portion 60 is in the second separated state.

The strong nip state is such a state that the second arm member 62 is pressed by the torsion coil spring 68*c* of the second drive portion 68 with a predetermined "pressing force of strong nip", and the driven rotating members 72, 73 mounted on the distal end of the second arm member 62 via the swing member 71 are brought into pressure contact with the roll sheet R. The weak nip state is such a state that the second arm member 62 is pressed by the torsion coil spring 68*c* of the second drive portion 68 with a predetermined "pressing force of weak nip", and the driven rotating members 72, 73 are brought into pressure contact with the roll sheet R. The first separated state is a state slightly separated from the maximum outer diameter of the roll sheet R by contact between the rotation cam 68*a* and the follower portion 62*c* of the second arm member 61 and the pressing force of the second arm member 62 to the roll sheet R is released (see FIG. 16A). The second separated state is a state in which the second arm member 62 is largely separated from the roll sheet R so that the user can manually set the roll sheet R in the supply device 200 (see FIG. 16B). Moreover, in the following explanation, a position of the second arm member 62 when the second sheet-supply portion 60 is in the first separated state is explained as a first separation position, and a position of the second arm member 62 when the second sheet-supply portion 60 is in the second separated state as a second separation position.

In most of those manufactured as the inward-wound roll sheet R, a material of the sheet 1 uses a soft vinyl chloride material or a soft poly ester as a base material. The sheet 1 as above has low conveyance resistance when passing through a paper-feed path. Therefore, by setting the pressing force at the strong nip of the second arm member 62 lower than the pressing force at the strong nip of the arm member 4, damage to the roll sheet R can be suppressed. In the Fifth Embodiment, similarly to the arm member 4, a plurality of the second arm members 62 and the swing members 71 are mounted so as to be aligned with intervals in the width direction of the roll sheet R.

In the Fifth Embodiment, the second arm member 62 is connected to the paper-ejection guide 91 via a link member, not shown, and it is configured that the second arm member 62 is rotationally moved in conjunction with an opening/closing operation of the paper-ejection guide 91. More specifically, when the paper-ejection guide 91 is opened, the second arm member 62 is opened and moved to the second separation position, and the second sheet-supply portion 60 is switched to the second separated state. And when the paper-ejection guide 91 is closed, the second arm member 62 is closed and is moved to the first separation position, and the second sheet-supply portion 60 is switched to the first separated state.

It is to be noted that, in the Fifth Embodiment, the paper-ejection guide 91 and the second arm member 62 are both provided in the print device 100, but it may be configured such that, without providing the paper-ejection guide 91, the second arm member 62 functions as a dust roll cover instead of the paper-ejection guide 91. For example, the second arm member 62 can be constituted by one component so as to cover the entirety in the width direction (X-axis direction) of the roll sheet R so that winding of the sheet 1 which has passed through the print portion 400 and was ejected, adhesion of trash from outside to the roll sheet R, and a scratch caused by contact can be prevented. Moreover, a plurality of swing members 71 can be mounted for one piece of the second arm member 62.

Second Supply Path 60*a*

In the Fifth Embodiment, the second supply path 60*a* of the second sheet-supply portion 60 is constituted by the second separation flapper 64 and the second arm member 62. The sheet 1 pulled out of the inward-wound roll sheet R2 passes below the driven rotating members 72, 73 mounted on the distal end of the second arm member 62 and is supplied to the second supply path 60*a*. The second supply path 60*a* is connected to the conveyance path 300*a* of the conveying portion 300, and the sheet 1 passes through the second supply path 60*a* and the conveyance path 300*a* and is conveyed to the print portion 400.

The sheet 1 pulled out of the inward-wound roll sheet R2 is supplied to the conveyance guide 61 via the second supply path 60*a* formed between the second separation flapper 64 and the second arm member 62. By means of the movement of the second separation flapper 64 and the second arm member 62 in accordance with the outer diameter of the roll sheet R, a gap is not formed between the roll sheet R and the conveyance guide 61, and regardless of the outer diameter of the roll sheet R, the sheet 1 can be reliably pulled out of the roll sheet R and be conveyed. The second sheet-detection sensor 67 is provided in the conveyance guide 61, and the second sheet-supply portion 60 is constituted capable of detecting passage of the leading end of the sheet 1 in the conveyance guide 61.

As described above, in a case where the sheet 1 has high stiffness and strong curling or in a case where the roll sheet R is susceptible to a scratch, it is preferable that the user manually supplies the sheet 1 after separating the contact member from the roll sheet R. According to the Fifth Embodiment, with the second sheet-supply portion 60 in the second separated state and the second arm member 62 largely separated from the roll sheet R, the sheet 1 can be supplied manually. That is, by pushing out the sheet 1 pulled out of the inward-wound roll sheet R2 from the front side of the printer main body with the hand placed on the second separation flapper 64, the user can lead it to the conveyance guide 61 along the second separation flapper 64. As a result, the user can supply the sheet 1 from the inward-wound roll sheet R2 with an easy access, and the sheet 1 can be supplied with favorable operability.

Figure 17:
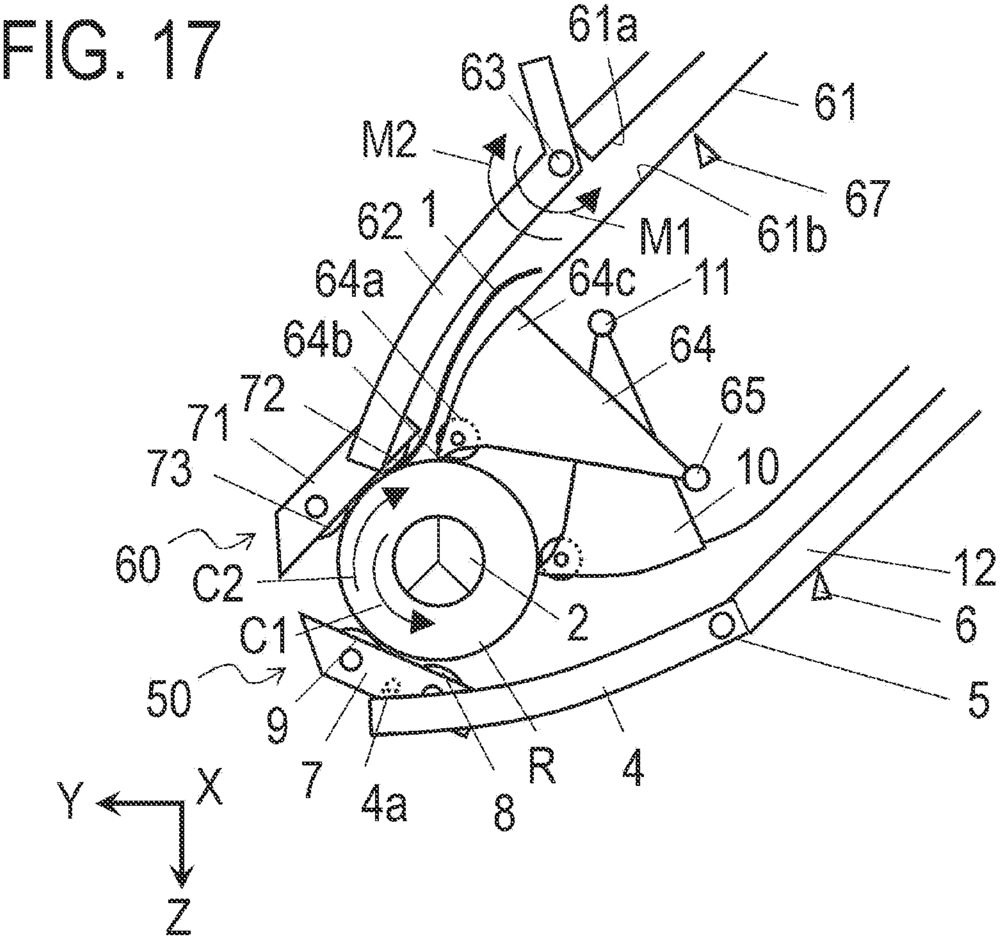
FIG. 17 is an explanatory diagram of a supply device in which a small-diameter roll is set according to the Fifth Embodiment.

FIG. 17 is an explanatory diagram of the supply device 200 in which the roll sheet R with a relatively small outer diameter is set. The roll sheet R shown in FIG. 17 is the inward-wound roll sheet R2, and its outer diameter is relatively small and is smaller than the outer diameter of the roll sheet R shown in FIG. 15.

In accordance with a decrease in the outer diameter of the roll sheet R, the second arm member 62 is rotationally moved in the arrow M1 direction, and the second separation flapper 64 is rotationally moved in the arrow N1 direction. As a result, the second separation flapper 64 forms a supply path from the second arm member 62 even when the outer diameter of the roll sheet R decreases and guides the lower surface of the sheet 1 by the guide surface 64*c*. As described above, since the second arm member 62 and the second separation flapper 64 are configured capable of rotational movement in accordance with the change in the outer diameter of the roll sheet R, the supply path with a substantially constant size is formed between them, regardless of the size of the outer diameter. As a result, the supply can be performed reliably without buckling of the sheet 1 with low stiffness or the like.

As described above, in the Fifth Embodiment, the arm member 4 as the first guide member, the second arm member 62 as the second guide member, the separation flapper 10 as the third guide member, and the second separation flapper 64 as the fourth guide member are provided in the supply device 200. By means of the configuration as above, regardless of the size of the outer diameter of the roll sheet R, when the sheet 1 is supplied from the outward-wound roll sheet R1, the sheet 1 is guided by the arm member 4 and the separation flapper 10 in the first supply path 50*a*. Moreover, regardless of the size of the outer diameter of the roll sheet R, when the sheet 1 is supplied from the inward-wound roll sheet R2, the sheet 1 is guided by the second arm member 62 and the second separation flapper 64 in the second supply path 60*a*. That is, according to the Fifth Embodiment, even when the inward-wound roll sheet R2 is set, the sheet 1 can be stably supplied as in the case where the outward-wound roll sheet R1 is set.

Control Configuration

Figure 18:
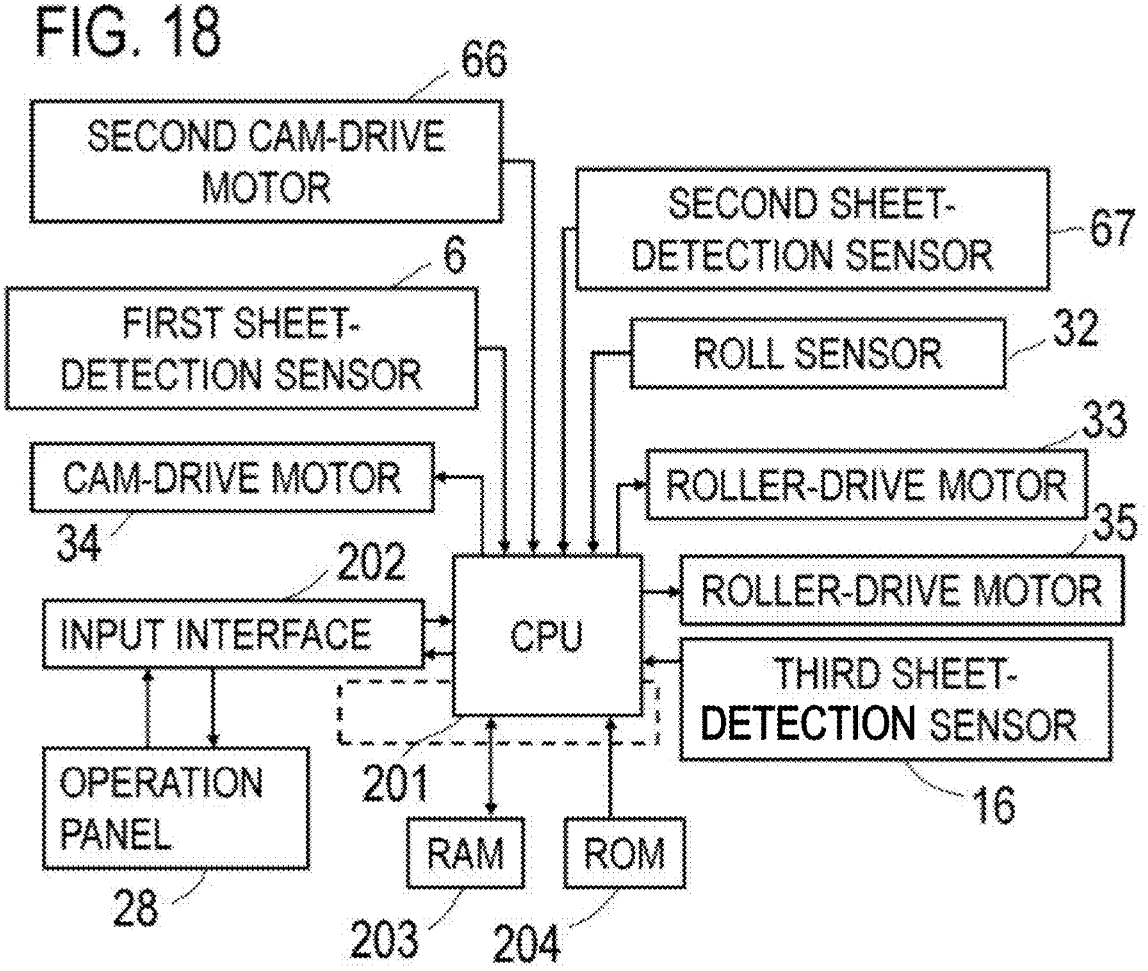
FIG. 18 is a block diagram of a control configuration of a print device according to the Fifth Embodiment.

Subsequently, a control configuration of the print device 100 will be explained, FIG. 18 is a block diagram illustrating a configuration example of a control system in the print device 100. In the Fifth Embodiment, as described above, the second cam-drive motor 66 is provided. The second cam-drive motor 66 is a motor for rotating the rotation cam 68*a* in order to adjust the pressing force to the second arm member 62. Since the configurations of the other control portion are similar to the control portion of the First Embodiment, the explanation will be omitted.

Sheet Supply Method

Figure 19:
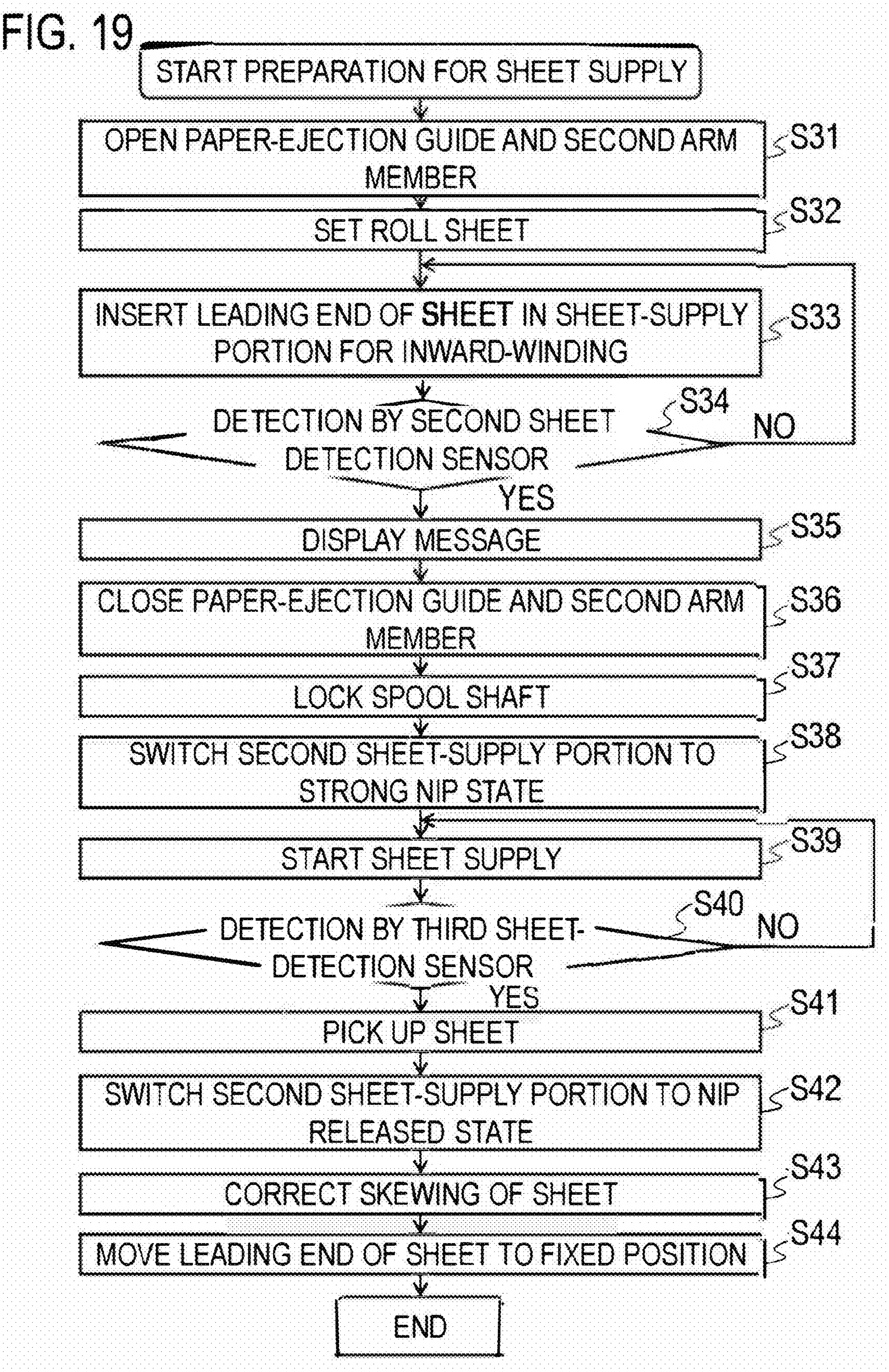
FIG. 19 is a flowchart of a sheet supply method according to the Fifth Embodiment.

Subsequently, on the basis of a flowchart, a method of automatically pulling the sheet 1 out of the inward-wound roll sheet R2 and supplying it in the supply device 200 will be explained. FIG. 19 is a flowchart illustrating a procedure of setting the inward-wound roll sheet R2 and automatically supplying the sheet 1 from the inward-wound roll sheet R2.

First, in order to set the inward-wound roll sheet R2 in the supply device 200, the user opens the paper-ejection guide 91 (Step S31). At this time, the second arm member 62 is also opened in conjunction with the paper-ejection guide 91, and the second sheet-supply portion 60 is brought into the second separated state shown in FIG. 16B. Moreover, at this time, the first sheet-supply portion 50 is in the weak nip state, and the arm member 4 stands by in a state pressed by the "pressing force of weak nip" in the arrow A1 direction.

And the inward-wound roll sheet R2 on which the spool member 2 is mounted is set in the supply device 200 (Step S32). The state that the inward-wound roll sheet R2 was set is detected by the roll sensor 32. After the roll sheet R is set, the second separation flapper 64 is switched from the separated state to the pressure contact state. The switching of the second separation flapper 64 may be performed either manually or automatically.

After the inward-wound roll sheet 2 is set, the user manually rotates the inward-wound roll sheet R2 in the arrow C2 direction and inserts the leading end of the sheet 1 in the supply path in the conveyance guide 61 along the guide surface 64*c* the second separation flapper 64 (Step S33). When the roll sheet R is rotated manually, operability is favorable when the reference flange 23 or the non-reference flange 24 is rotated. Moreover, when the sheet 1 is inserted in the supply path in the conveyance guide 61, it is preferable that, after sagging of the sheet 1 is removed by rotating the inward-wound roll sheet R2 in the arrow C1 direction, the inward-wound roll sheet R2 is rotated in the arrow C2 direction. It is to be noted that, in a case where the curling of the leading end part of the sheet is strong due to a material or a remaining amount of the sheet 1, and the sheet 1 is not separated by the second separation flapper 64, the user can separate the sheet 1 by holding it with the hand and set it on the guide surface 64*c*.

After the sheet 1 pulled out of the inward-wound roll sheet R2 is inserted in the conveyance path in the conveyance guide 61, the sheet 1 is detected by the second sheet-detection sensor 67 (Step S34). When the sheet 1 is inserted to a position detected by the second sheet-detection sensor 67 (YES at Step S34), the CPU 201 of the print device 100 causes a message "Close the paper-ejection guide" to be displayed on the display portion of the operation panel 28 (Step S35).

When the user closes the paper-ejection guide 91 in response to the message displayed on the operation panel 28 (Step S36), the second arm member 62 also moves in conjunction. And the CPU 201 locks the spool shaft 21 by the locking mechanism so that the spool shaft 21 does not rise from the spool holder 31 (Step S37). When the spool shaft 21 holding the inward-wound roll sheet R2 is locked to the supply device 200, the CPU 201 switches the second sheet-supply portion 60 to the strong nip state (Step S38).

After that, the CPU 201 rotates the inward-wound roll sheet R2 by the roll-drive motor 33 in the arrow C2 direction and starts supply of the sheet 1 (Step S39). After the supply of the sheet 1 is started, the sheet 1 is detected by the third sheet-detection sensor 16 of the conveying portion 300 (Step S40). While the sheet 1 is not detected by the third sheet-detection sensor 16 (NO at Step S40), the inward-wound roll sheet R2 continues to rotate. When the leading end of the sheet 1 is detected by the third sheet-detection sensor 16 (YES at Step S40), the CPU 201 rotates the conveyance roller 14 forward in the arrow D1 direction. And by means of the conveyance roller 14 and the nip roller 15, the leading end of the sheet 1 is held and picked up (Step S41). When the pick-up of the sheet 1 is completed, the CPU 201 switches the first sheet-supply portion 50 to the nip released state and switches the second sheet-supply portion 60 to the first separated state (nip released state) (Step S42). At this time, the pressing force for pressing the arm member 4 in the arrow A1 direction and the pressing force for pressing the second arm member 62 in the arrow M1 direction are released, and the driven rotating members 72, 73 of the first sheet-supply portion 50 and the second sheet-supply portion 60 are separated from the inward-wound roll sheet R2, respectively.

After that, similarly to Step S13 (see FIG. 10) in the First Embodiment, the skewing correction of the sheet 1 is performed (Step S43). And the CPU 201 causes the leading end of the sheet 1 to move by the conveying portion 300 to the standby position (fixed position) before print start in the print portion 400 (Step S44). As a result, the preparation for the supply of the sheet 1 to the print portion is completed. After that, the sheet 1 is pulled out of the roll sheet R with the rotation of the roll sheet R and is conveyed by the conveying portion 300 to the print portion 400.

As described above, in the Fifth Embodiment, the supply device 200 includes the arm member 4 for outward-winding, the driven rotating members 8, 9, the second arm member 62 for the inward-winding, and the driven rotating members 72, 73. Therefore, according to the Fifth Embodiment, the supply device 200 can automatically separate the sheet 1 from the roll sheet R and supply it, regardless of the winding direction of the sheet 1 of the set roll sheet R.

It is to be noted that, in order to configure the supply device 200 capable of automatic supply of the sheet 1 whether it is the outward-wound roll sheet R1 or the inward-wound roll sheet R2, the configurations described in the aforementioned Embodiments are not limiting. For example, the driven rotating member supported by the arm member may be a contact body which is not rotated, and it is only necessary that the supply device 200 includes the first guide member, the first contact body supported by the first guide member, the second guide member, and the second contact body supported by the second guide member. And it is only necessary to be configured such that the sheet 1 pulled out of the outward-wound roll sheet R1 is guided and supplied by the first guide member and the first contact body, and the sheet 1 pulled out of the inward-wound roll sheet R2 is guided and supplied by the second guide member and the second contact body.

Sixth Embodiment

Subsequently, a Sixth Embodiment according to the present invention will be explained. The supply device 200 of the Sixth Embodiment is different from the First Embodiment in a point that a shielding member 81 and a fourth sheet-detection sensor 86 are provided. Hereinafter, in the explanation of the Sixth Embodiment, the same signs are given to the configurations similar to those in the First Embodiment, for which explanation will be omitted, and only featured configurations of the Sixth Embodiment will be explained.

Supply Device 200

Figure 20A:
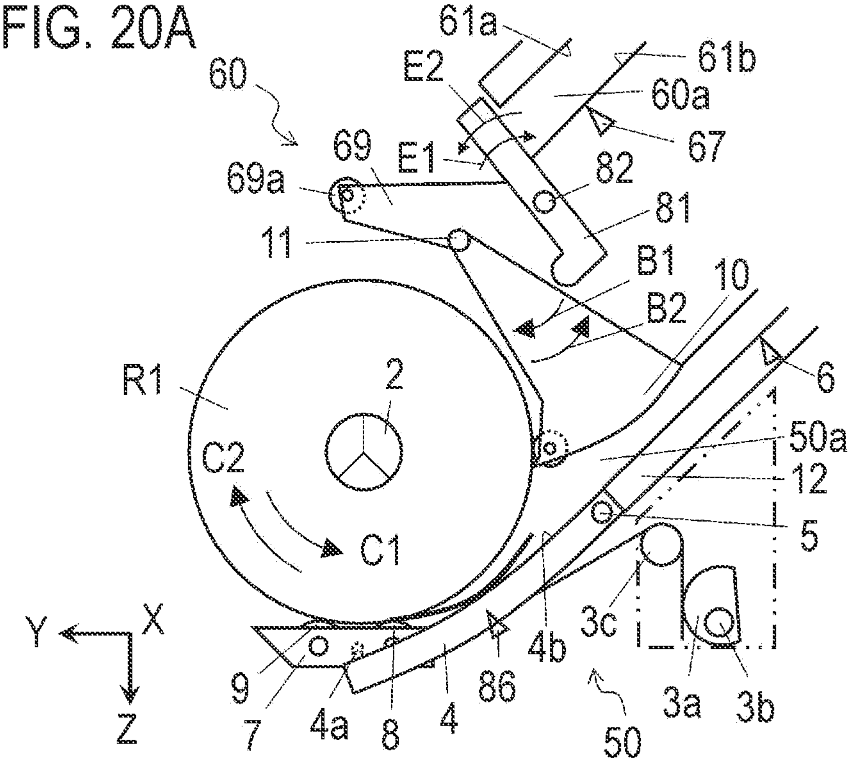
FIGS. 20A and 20B are explanatory diagrams of a sheet supply portion according to a Sixth Embodiment.
Figure 20B:
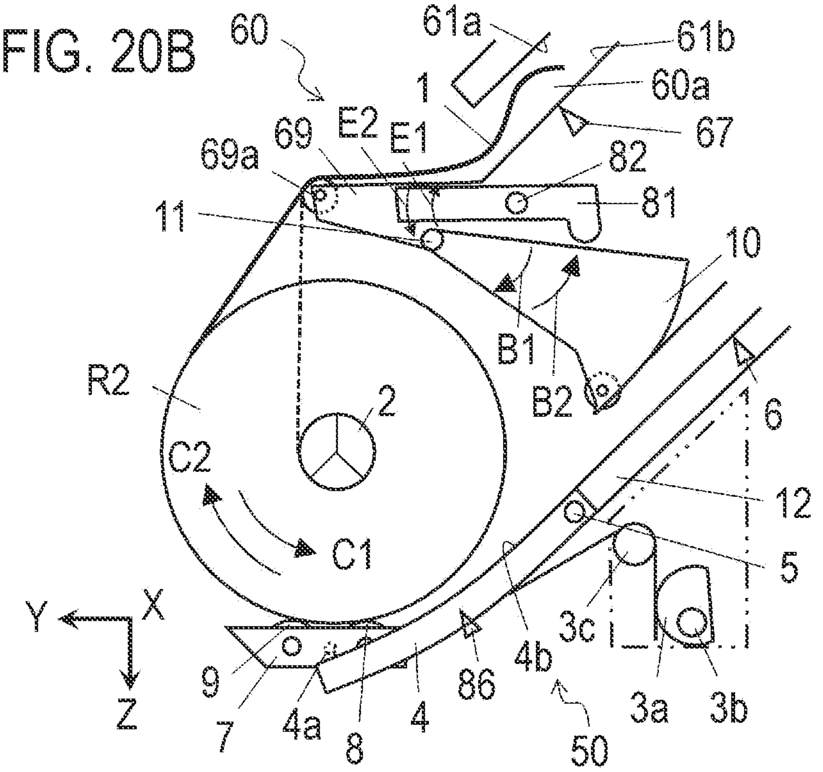

First, a configuration of the supply device 200 of the print device 100 according to the Sixth Embodiment will be explained. FIGS. 20A and 20B are explanatory diagrams illustrating a state of the first sheet-supply portion 50 and the second sheet-supply portion 60 of the supply device 200 according to the Sixth Embodiment. FIG. 20A illustrates a state in which the sheet 1 is supplied from the outward-wound roll sheet R1 to the first sheet-supply portion 50, and FIG. 20B illustrates a state in which the sheet 1 is supplied from the inward-wound roll sheet R2 to the second sheet-supply portion 60.

The first sheet-supply portion 50 of the Sixth Embodiment includes the fourth sheet-detection sensor 86 for detecting the sheet 1 guided by the arm member 4, which is a guide member. The sheet 1 separated from the outward-wound roll sheet R1 passes above the driven rotating members 8, 9 and passes through the first supply path 50*a* by being guided by the guide portion 4*b* of the arm member 4. And the sheet 1 passing above the guide portion 4*b* of the arm member 4 is detected by the fourth sheet-detection sensor 86.

In the Sixth Embodiment, the separation flapper 10 of the first sheet-supply portion 50 is configured to be movable between a contact position where it is in contact with the roll sheet R set in the supply device 200 and a separation position where it is separated from the roll sheet R. As shown in FIG. 20A, when the sheet 1 is supplied from the outward-wound roll sheet R1, the separation flapper 10 is located at the contact position, which is a position for outward-winding. On the other hand, as shown in FIG. 20B, when the sheet 1 is supplied from the inward-wound roll sheet R2, the separation flapper 10 is located at the separation position, which is a position for inward-winding. The rotational movement mechanism for the separation flapper 10 (flapper movement mechanism) can be configured similarly to the rotational movement mechanism of the separation flapper 10 explained as the Fourth Embodiment (see FIG. 13).

When the inward-wound roll sheet R2 is rotated by the roll-drive motor 33 in the arrow C2 direction in a state where the inward-wound roll sheet R2 is set, since the roll sheet R is rotated in an unwound direction, there is a concern that jamming occurs. Thus, as in the Sixth Embodiment, when the inward-wound roll sheet R2 is set, it is preferable to set the separation flapper 10 for outward-winding is located at the separation position, which is a position for inward-winding, from a viewpoint of suppression of occurrence of jamming.

In the supply device 200 of the Sixth Embodiment, the shielding member 81 which is capable of rotational movement in arrow E1, E2 directions around a rotation shaft 82 extending in the width direction (X-axis direction) of the supply device 200 is provided. The shielding member 81 is configured capable of rotational movement to a shielding position where the second sheet-supply portion 60 is blocked so that the sheet 1 cannot pass through the second supply path 60*a* and a retreat position which allows passage of the sheet 1 through the second supply path 60*a*.

The shielding member 81 is urged by a spring, not shown, in the arrow E1 direction and is located at the shielding position while the pressing force is not given from another member. When the shielding member 81 is located at the shielding position, one end side of the shielding member 81 extended from the rotation shaft 82 blocks the second sheet-supply portion 60, while the other end side of the shielding member 81 is located in the vicinity of the separation flapper 10. And when the separation flapper 10 is rotationally moved in the arrow B2 direction and moves from the contact position to the separation position, the shielding member 81 is pushed by the separation flapper 10 and is rotationally moved in the arrow E2 direction. When the shielding member 81 is rotationally moved in the arrow E2 direction and moves from the shielding position to the retreat position, the one end side of the shielding member 81 retreats from on the conveyance path of the sheet 1 in the second sheet-supply portion 60, whereby the second sheet-supply portion 60 is opened.

Sheet Supply Method

Figure 21:
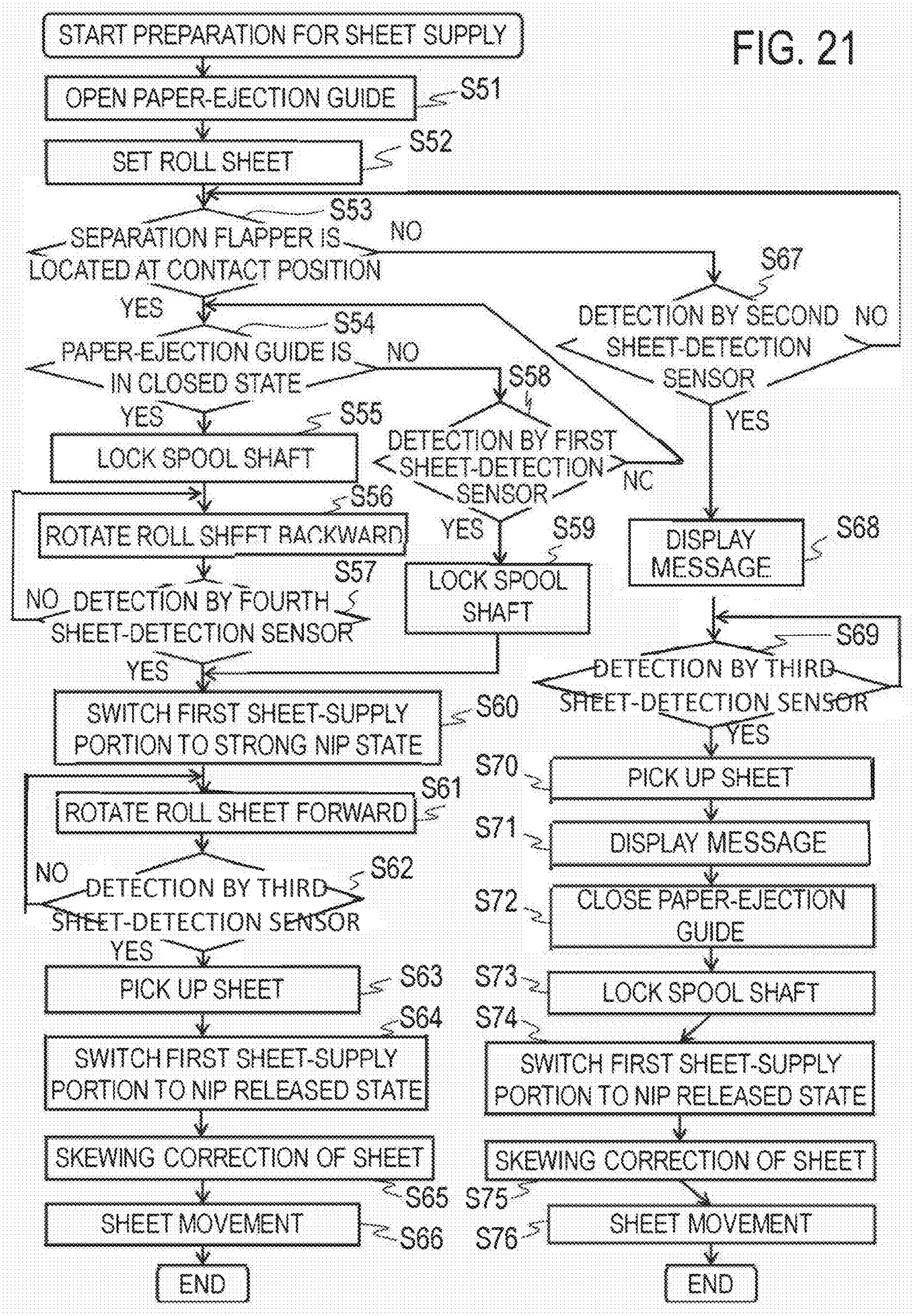
FIG. 21 is a flowchart of a sheet supply method according to the Sixth Embodiment.

Subsequently, on the basis of the flowchart, the supply method of the sheet 1 in the supply device 200 according to the Sixth Embodiment will be explained. FIG. 21 is a flowchart illustrating a supply procedure of the sheet 1 according to the Sixth Embodiment. Steps S51 to S66 are steps for supplying the sheet 1 from the outward-wound roll sheet R1, and Steps S51 to S53 and Steps S67 to S76 are steps for supplying the sheet 1 from the inward-wound roll sheet R2.

First, a case in which the outward-wound roll sheet R1 is set in the supply device 200, and the sheet 1 is supplied will be explained as an example. In order to set the outward-wound roll sheet R1 in the supply device 200, the user opens the paper-ejection guide 91, which is a dust roll cover for the roll sheet R (Step S51). Then, the user sets the outward-wound roll sheet R1 on which the spool member 2 is mounted in the supply device 200 (Step S52). At this time, the separation flapper 10 for outward-winding is disposed at the contact position, which is a position for outward-winding (YES at Step S53). Then, when the paper-ejection guide 91 is closed into a closed state (YES at Step S54), the spool shaft 21 is locked (Step S55).

When the spool shaft 21 holding the outward-wound roll sheet R1 is locked in the supply device 200, the outward-wound roll sheet R1 is rotated (backward) by the roll-drive motor 33 in the arrow C2 direction (Step S56). By means of this operation, the leading end of the sheet 1 goes over the fourth sheet-detection sensor 86 and is detected by the fourth sheet-detection sensor 86 (YES at Step S57), and the sagging of the roll sheet R is solved. On the other hand, while the leading end of the sheet 1 is not detected by the fourth sheet-detection sensor 86 (NO at Step S57), the outward-wound roll sheet R1 continues to rotate. After the fourth sheet-detection sensor 86 detects the sheet 1, rotation drive of the outward-wound roll sheet R1 by the roll-drive motor 33 is stopped, and the first sheet-supply portion 50 is switched to the strong nip state (Step S60). By means of the configuration as above, the user only needs to set the outward-wound roll sheet R1 in the supply device 200 for the supply of the sheet 1, and manual insertion of the leading end of the outward-wound roll sheet R1 into the sheet supply port of the first sheet-supply portion 50 becomes unnecessary. Thus, the outward-wound roll sheet R1 can be easily supplied.

On the other hand, when the first sheet-detection sensor 6 detects the leading end of the sheet 1 (YES at Step S58) in a state where the paper-ejection guide 91 is not closed (NO at Step S54), the spool shaft 21 is locked (Step S59). And after the spool shaft 21 is locked, the first sheet-supply portion 50 is switched to the strong nip state (Step S60). By having the configuration as above, even when the leading end of the sheet 1 is manually inserted in the first supply path 50*a*, and the sheet 1 is conveyed to the conveyance guide 12, the sheet 1 can be supplied appropriately.

After the first sheet-supply portion 50 is switched to the strong nip state, the roll sheet R is rotated (forward) by the roll-drive motor 33 in the arrow C1 direction (Step S61). And the sheet 1 is conveyed, and the roll sheet R continues to be rotated until the leading end of the sheet 1 is detected by the third sheet-detection sensor 16 (YES at Step S62).

After the sheet 1 is detected by the third sheet-detection sensor 16, the pickup of the sheet 1 (Step S63), the switching of the arm member 4 to the nip released state (Step S64), the skewing correction of the sheet 1 (Step S65), and the movement of the sheet (Step S66) are performed. The operations of Steps S63 to S66 are similar to Steps S11 to S14 (see FIG. 10) in the First Embodiment. And when the leading end of the sheet 1 has moved to the standby position (fixed position) before start of the print in the print portion 400 (Step S66), the preparation for the supply of the sheet 1 to the print portion 400 is completed.

Subsequently, a case in which the inward-wound roll sheet R2 is set in the supply device 200 and the sheet 1 is supplied will be explained as an example. Steps S51, S52 are performed similarly for the case in which the outward-wound roll sheet R1 is set and the case in which the inward-wound roll sheet R2 is set. That is, the user opens the paper-ejection guide 91 (Step S51) and sets the inward-wound roll sheet R2 on which the spool member 2 is mounted (Step S52). At this time, the separation flapper 10 for outward-winding is disposed at the separation position, which is the position for inward-winding (NO at Step S53).

When the separation flapper 10 is located at the separation position, the shielding member 81 is located at the retreat position, and the second supply path 60*a* of the second sheet-supply portion 60 is opened. In other words, when the separation flapper 10 is not located at the separation position, the second supply path 60*a* is blocked by the shielding member 81 and thus, in a state where the separation flapper 10 is located at the contact position, the sheet 1 cannot be supplied from the second sheet-supply portion 60. Therefore, when the sheet 1 is supplied from the inward-wound roll sheet R2 to the second sheet-supply portion 60, the separation flapper 10 is separated from the inward-wound roll sheet R2 without fail and thus, occurrence of jamming can be suppressed.

After the separation flapper 10 for outward-winding is located at the separation position, the user manually pulls the sheet 1 out of the inward-wound roll sheet R2 and supplies it. Then, the user manually conveys the sheet 1 to a position where the leading end of the sheet 1 is detected by the second sheet-detection sensor 67.

After the sheet 1 is detected by the second sheet-detection sensor 67 (YES at Step S67), steps similar to Steps S16 to S24 in the First Embodiment are executed. Specifically, display of a message prompting the user to feed in the sheet 1 (Step S68), the detection of the sheet by the third sheet-detection sensor 16 (Step S69), the pickup of the sheet (Step S70), and display of a message to prompt the user to close the paper-ejection guide 91 are performed (Step S71). After that, the paper-ejection guide 91 is closed (Step S72), the spool shaft 21 is locked (Step S73), and the arm member 4 is switched to the nip released state (Step S74). Then, the skewing correction of the sheet 1 (Step S75) is performed, and when the leading end of the sheet 1 is moved to the standby position (fixed position) before print start in the print portion 400 (Step S76), the preparation for the supply of the sheet 1 to the print portion 400 is completed.

It is to be noted that, in the Sixth Embodiment, when the inward-wound roll sheet R2 is to be supplied, it was configured such that the leading end of the inward-wound roll sheet R2 is manually supplied from the second sheet-detection sensor 67 to the third sheet-detection sensor 16. However, in the aforementioned configuration, too, a mechanism for automatically supplying the sheet 1 from the inward-wound roll sheet R2 explained in the Fifth Embodiment may be provided. In this case, by rotating the roll sheet R by the roll-drive motor 33 in the arrow C2 direction, the automatic supply from the second sheet-detection sensor 67 to the third sheet-detection sensor 16 is enabled. It is to be noted that, if the outward-wound roll sheet R1 is rotated by the roll-drive motor 33 in the arrow C2 direction in a state where the outward-wound roll sheet R1 is set, rotation is made in a direction in which the sheet 1 is wound around the outward-wound roll sheet R1 and thus, the sheet 1 cannot be supplied Therefore, control of the rotating direction of the roll sheet R by the roll-drive motor 33 is performed oppositely between the outward-wound roll sheet R1 and the inward-wound roll sheet R2.

As described above, according to the Sixth Embodiment, when the inward-wound roll sheet R2 is set in the supply device 200, the sheet 1 can be supplied to the second sheet-supply portion 60 in the state where the separation flapper 10 for outward-winding is reliably separated from the inward-wound roll sheet R2. As a result, occurrence of jamming can be suppressed.

OTHER EMBODIMENTS

It is to be noted that, the present invention can be applied not only to the configuration of each of the aforementioned Embodiments, but various changes can be applied. For example, the print device is not limited only to the configuration including one sheet supply device corresponding to both the roll sheets of the outward-winding and the inward-winding but may be such a configuration that includes two or more sheet supply devices. Moreover, the print device only needs to have such a configuration that an image is printed on the sheet supplied from the sheet supply device and is not limited only to an inkjet print device. Moreover, a print method and a configuration of the print device are optional. For example, the print method may be a serial scanning method or a full-line method. In the case of the serial scanning method, print scanning of the print head and a conveying operation of the sheet are repeated, and an image printed, while in the case of the full-line method, a sheet is continuously conveyed to a position opposed to a lengthy print head, and an image is printed.

Moreover, not all the configurations of each of the aforementioned Embodiments are required in application of the present invention. For example, the movement mechanism for moving the arm member and the separation flapper can be replaced with other well-known movement mechanisms, and the arm member may be directly and rotationally moved by motor drive by connecting a motor to the rotation shaft of the arm member. Moreover, the configurations of each of the aforementioned Embodiments may be combined with one another.

Moreover, the present invention can be applied to various sheet supply devices in addition to the sheet supply device which supplies a sheet as a print medium to the print device. For example, it can be applied also to a device which supplies a sheet to be read to a reading device such as a scanner and a copying machine and a device which supplies a sheet-like machining material to a machining device such as a cutting device. The sheet supply device as above can be configured separately from the devices such as the print device, the reading device, the machining device and the like, and a control portion (CPU) for the sheet supply device may be provided individually.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A sheet supply device comprising:
a support portion that rotatably supports a roll sheet;
a first supply path to which a sheet from the roll sheet supported by the support portion is supplied;
a second supply path to which a sheet from the roll sheet supported by the support portion is supplied;

a drive portion that rotates the roll sheet supported by the support portion, the drive portion rotating the roll sheet in a first direction for supplying the sheet to the first supply path and a second direction opposite to the first direction for supplying the sheet to the second supply path;

a conveyance path that conveys the sheet supplied from the first supply path and the second supply path;

a first contact body in contact with an outer peripheral surface of the roll sheet supported by the support portion;

a first guide member which supports the first contact body and guides the sheet supplied from the roll sheet to the first supply path;

a second contact body in contact with the outer peripheral surface of the roll sheet supported by the support portion; and a second guide member which supports the second contact body and guides the sheet supplied from the roll sheet to the second supply path.

2. The sheet supply device according to claim 1, wherein an inlet of the first supply path is located on a lower side in a vertical direction relative to a rotation center of the roll sheet supported by the support portion; and an inlet of the second supply path is located on an upper side in the vertical direction relative to the rotation center of the roll sheet supported by the support portion.

3. The sheet supply device according to claim 1, wherein a sheet detection sensor that detects passage of a leading end of the sheet is provided in the first supply path and the second supply path.

4. The sheet supply device according to claim 1, wherein the first guide member and the first contact body move in conjunction with a change in an outer diameter of the roll sheet supported by the support portion, and the second guide member and the second contact body move in conjunction with a change in the outer diameter of the roll sheet supported by the support portion.

5. The sheet supply device according to claim 1, wherein the first contact body is in contact with an outer diameter of the roll sheet from a lower side in a vertical direction, and the second contact body is in contact with the outer diameter of the roll sheet from an upper side in a vertical direction.

6. The sheet supply device according to claim 1, further comprising:

a first movement mechanism that causes the first contact body to be brought into contact with or separated from the roll sheet; and a second movement mechanism that causes the second contact body to be brought into contact with or separated from the roll sheet.

7. The sheet supply device according to claim 6, wherein the second movement mechanism is a movement mechanism that moves the second guide member supporting the second contact body, with the second guide member being configured to be movable to a first separation position where the second contact body is separated from the roll sheet and to a second separation position where the second contact body is separated from the roll sheet at a greater distance than that of the first separation position.

8. A sheet supply device comprising:

a support portion that rotatably supports a roll sheet;

a first supply path to which a sheet from the roll sheet supported by the support portion is supplied;

a second supply path to which a sheet from the roll sheet supported by the support portion is supplied and located on an upper side of the first supply path;

a drive portion that rotates the roll sheet supported by the support portion, the drive portion rotating the roll sheet in a first direction for supplying the sheet to the first supply path and a second direction opposite to the first direction for supplying the sheet to the second supply path;

a conveyance path that conveys the sheet supplied from the first supply path and the second supply path;

a separation flapper provided between the first supply path and the second supply path and separating a leading end of the sheet from the roll sheet rotated in the first direction in the support portion; and a flapper movement mechanism moving the separation flapper to a contact position in contact with the roll sheet and to a separation position separated from the roll sheet.

9. The sheet supply device according to claim 8, wherein the second supply path has a lower guide portion that guides a lower part of the sheet; and a space for manual supply of the sheet is formed above the lower guide portion.

10. The sheet supply device according to claim 9, wherein a driven roller is provided on an end part, which is on an upstream side with respect to a conveying direction of the sheet, of the lower guide portion.

11. The sheet supply device according to claim 9, wherein the second supply path has an upper guide portion, which is opposed to the lower guide portion on a downstream side of the space in a conveying direction of the sheet and which guides an upper part of the sheet.

12. The sheet supply device according to claim 8, further comprising a shielding member which is movable between a shielding position that blocks the second supply path and a retreat position that allows passage of the second supply path, wherein the shielding member moves in conjunction with the separation flapper, and is located at the shielding position in a case in which the separation flapper is at the contact position and is located at the retreat position in a case in which the separation flapper is located at the separation position.

13. A recording device comprising:

a support portion that rotatably supports a roll sheet;

a first supply path to which a sheet from the roll sheet supported by the support portion is supplied;

a second supply path to which a sheet from the roll sheet supported by the support portion is supplied;

a drive portion that rotates the roll sheet supported by the support portion, the drive portion rotating the roll sheet in a first direction for supplying the sheet to the first supply path and a second direction opposite to the first direction for supplying the sheet to the second supply path;

a conveyance path that conveys the sheet supplied from the first supply path and the second supply path;

a recording portion that is connected to the conveyance path and performs a recording operation on the sheet sent out to the conveyance path;

a first contact body in contact with an outer peripheral surface of the roll sheet supported by the support portion;

a first guide member which supports the first contact body and guides the sheet supplied from the roll sheet to the first supply path;

a second contact body in contact with the outer peripheral surface of the roll sheet supported by the support portion; and a second guide member which supports the second contact body and guides the sheet supplied from the roll sheet to the second supply path.

* * * * *